(12) United States Patent
Tanaka et al.

(10) Patent No.: US 12,534,788 B2
(45) Date of Patent: Jan. 27, 2026

(54) STEEL SHEET

(71) Applicant: NIPPON STEEL CORPORATION, Tokyo (JP)

(72) Inventors: Yasuaki Tanaka, Tokyo (JP); Hitoshi Nikaido, Tokyo (JP); Hiroyuki Kawata, Tokyo (JP); Natsuko Sugiura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 604 days.

(21) Appl. No.: 17/915,354

(22) PCT Filed: Mar. 30, 2021

(86) PCT No.: PCT/JP2021/013530
§ 371 (c)(1),
(2) Date: Sep. 28, 2022

(87) PCT Pub. No.: WO2021/205943
PCT Pub. Date: Oct. 14, 2021

(65) Prior Publication Data
US 2023/0141963 A1    May 11, 2023

(30) Foreign Application Priority Data

Apr. 7, 2020  (JP) .................................. 2020-068971
Oct. 2, 2020  (JP) .................................. 2020-167969

(51) Int. Cl.
*C22C 38/58*    (2006.01)
*C22C 38/00*    (2006.01)
(Continued)

(52) U.S. Cl.
CPC ............ *C22C 38/58* (2013.01); *C22C 38/002* (2013.01); *C22C 38/02* (2013.01); *C22C 38/06* (2013.01);
(Continued)

(58) Field of Classification Search
None
See application file for complete search history.

(56) References Cited

U.S. PATENT DOCUMENTS 4,473,414 A    9/1984  Irie et al.
2012/0012231 A1  1/2012  Murakami et al.
(Continued)

FOREIGN PATENT DOCUMENTS

EP    2 692 895 A1    2/2014
EP    2 762 583 A1    8/2014
(Continued)

*Primary Examiner* — Jenny R Wu
(74) *Attorney, Agent, or Firm* — Birch, Stewart, Kolasch & Birch, LLP (57) ABSTRACT

There is provided a steel sheet including a chemical composition consisting of, in mass %: C: 0.03 to 0.25%, Si: 0.1 to 2.0%, Mn: 1.0 to 3.0%, P: 0.200% or less, S: 0.0500% or less, Al: 0.01 to 1.00%, N: 0.0100% or less, and Ti: 0.01 to 0.25%, with the balance: Fe and impurities, and a steel micro-structure containing, in area %: ferrite: 50 to 85%, the balance being one or more kinds selected from martensite, bainite, and retained austenite, and an intensity of γ-fiber is more than 4.0 times in terms of random intensity ratio, and an average KAM value of grains having crystal orientations that form angles within 10° from γ-fiber is 1.30° or less.

3 Claims, 1 Drawing Sheet

(51) Int. Cl.
  *C22C 38/02* (2006.01)
  *C22C 38/06* (2006.01)
  *C22C 38/42* (2006.01)
  *C22C 38/48* (2006.01)
  *C22C 38/50* (2006.01)
(52) U.S. Cl.
  CPC .............. *C22C 38/42* (2013.01); *C22C 38/48*
           (2013.01); *C22C 38/50* (2013.01)

(56) References Cited

U.S. PATENT DOCUMENTS

| | | | |
|---|---|---|---|
| 2014/0014236 A1* | 1/2014 | Nozaki | C22C 38/26 |
| | | | 148/333 |
| 2014/0234659 A1* | 8/2014 | Kawata | C23C 2/06 |
| | | | 148/504 |
| 2018/0023160 A1 | 1/2018 | Minami et al. | |
| 2018/0023161 A1 | 1/2018 | Minami et al. | |

FOREIGN PATENT DOCUMENTS

| | | |
|---|---|---|
| JP | 56-139654 A | 10/1981 |
| JP | 2005-264323 A | 9/2005 |
| JP | 2009-114523 A | 5/2009 |
| JP | 2016-141859 A | 8/2016 |
| JP | 6032298 B2 | 11/2016 |
| WO | WO 2010/114131 A1 | 10/2010 |

* cited by examiner

STEEL SHEET

TECHNICAL FIELD

The present invention relates to a steel sheet.

BACKGROUND ART

With increasing needs of weight reduction against a backdrop of an energy issue, application of a high-strength steel sheet, which enables reduction of a sheet thickness, have been advancing to a wide range of members of private cars and trucks, even covering members such as a door and a hood as well as panels.

Many of these automobile body components are formed by pressing, and thus a high-strength steel sheet to be applied to such components are required to have excellent formability. In particular, many of covering members include a processed element formed by draw forming at their corner parts (corner edge parts), door handle emboss parts, or the like; therefore, a blank steel sheet is required to have a high strength as well as a high r value.

Many of conventional techniques for enhancing an r value of a thin steel sheet are established for mild steels, which are substantially constituted by a ferritic single phase micro-structure. The recapitulation of these techniques is to control a texture such that a {111} plane of crystal orientations of a material is aligned with a surface of a rolled sheet, that is, such that γ-fiber is increased, by reducing dissolved carbon and/or dissolved nitrogen as much as possible before cold rolling to cause discontinuous recrystallization in a cold-rolling step and an annealing step. A typical steel type is an interstitial free (IF) steel, which is an ultra-low carbon steel made to contain Ti and/or Nb, and studies about adding a solid-solution strengthening element to the IF steel have been conducted for high strengthening.

For example, Patent Document 1 discloses a cold-rolled steel sheet in which contents of Al and Nb are controlled in relation to contents of N and C, and P, Si, and Mn are added. Patent Document 2 presents a high-strength steel sheet that includes ferritic phases and hard second phases and is excellent in r value and hole-expansion property.

On the other hand, Patent Document 3 discloses a high-strength steel sheet in which a ratio between an intensity of γ-fiber and an intensity of α-fiber is set to one or more. Further, Patent Document 4 discloses a high-strength cold-rolled steel sheet that is excellent in rigidity, deep drawability, and hole-expansion property and in which {332}<113> texture is strengthened.

LIST OF PRIOR ART DOCUMENTS

Patent Document

Patent Document 1: JP56-139654A
Patent Document 2: JP2005-264323A
Patent Document 3: JP2016-141859A
Patent Document 4: JP2009-114523A

SUMMARY OF INVENTION

Technical Problem

However, the steel sheet provided by the technique according to Patent Document 1 has a strength (TS) that remains at less than 500 MPa. Further, the technique according to Patent Document 2 requires reduction of a content of carbon so as to cause γ-fiber to develop, and the resultant strength remains at about 650 MPa.

Patent Document 3 discloses a 780 MPa class high-strength steel sheet. However, in order to provide the steel sheet by the disclosed technique, it is necessary to perform annealing twice after cold rolling: annealing for forming a texture and annealing for forming a high-strength steel micro-structure, which raises a problem of increased costs. Further, Patent Document 4 discloses a steel sheet that has a tensile strength of 890 MPa or more, a high average r value, and a high Young's modulus as well as an excellent hole-expansion property. However, in order to produce a desired texture, Mo and W, which are expensive, need to be contained as essential elements, which raises a problem of increased alloy costs and an increased hot rolling load, and leaves room for improvement.

Many of covering members generally have shapes like a large rectangle. From a viewpoint of keeping a yield of starting materials, such members are normally taken from a blank steel sheet such that a longitudinal direction of the members matches a rolling direction or a width direction of the blank steel sheet. In addition, since many of covering members include a processed element formed by draw forming at their corner parts as described above, it is particularly important to increase an r value in a direction of 45° with respect to the rolling direction (hereinafter, also referred to as "$r_{45}$ value").

Additionally, of covering members, members such as a hood and a door have recently been required to have a high designability, and such members have been locally provided with a high-deformation region called a character line. For that reason, it is important for covering members to have a high $r_{45}$ value, as well as a high ultimate deformability.

As described above, there is a need of a steel sheet that has not only a high strength but also a high $r_{45}$ value and a high ultimate deformability in order to provide a member that is light and has a high designability.

An objective of the present invention is to solve the problems described above and to provide a steel sheet that has a high tensile strength, a high $r_{45}$ value, and a high ultimate deformability.

Solution to Problem

The present invention has been made to solve the above problems and has a gist of the following steel sheet.

(1) A steel sheet having
a chemical composition consisting of, in mass %:
C: 0.03 to 0.25%,
Si: 0.1 to 2.0%,
Mn: 1.0 to 3.0%,
P: 0.200% or less,
S: 0.0500% or less,
Al: 0.01 to 1.00%,
N: 0.0100% or less, and
Ti: 0.01 to 0.25%,
with the balance: Fe and impurities, and
a steel micro-structure containing, in area %:
ferrite: 50 to 85%,
with the balance being one or more kinds selected from martensite, bainite, and retained austenite, wherein
an intensity of γ-fiber is more than 4.0 times in terms of random intensity ratio, and an average KAM value of grains having crystal orientations that form angles within 10° from γ-fiber is 1.30° or less.

(2) The steel sheet according to the above (1), wherein the chemical composition contains, in lieu of a part of the Fe, one or more kinds selected from, in mass %:
Cr: 0.50% or less,
Ni: 0.50% or less, and
Cu: 0.50% or less.
(3) The steel sheet according to the above (1) or (2), wherein the chemical composition contains, in lieu of a part of the Fe, one or more kinds selected from, in mass %:
Nb: 0.050% or less,
V: 0.15% or less,
Zr: 0.15% or less,
Mo: 0.15% or less, and
W: 0.15% or less.
(4) The steel sheet according to any one of (1) to (3) above, wherein the chemical composition contains, in lieu of a part of the Fe, one or more elements selected from, in mass %, Sn, Sb, and Te at 0.100% or less in total.
(5) The steel sheet according to any one of (1) to (4) above, wherein the chemical composition contains, in lieu of a part of the Fe, one or more elements selected from, in mass %, Ca, Mg, and REM at 0.0050% or less in total.
(6) The steel sheet according to any one of (1) to (5) above, wherein the chemical composition contains, in lieu of a part of the Fe, in mass %, B: 0.0050% or less.
(7) The steel sheet according to any one of (1) to (6) above, including a decarburized layer having a thickness of 4.0 μm or more from a surface of the steel sheet in a depth direction.

Advantageous Effects of Invention

According to the present invention, it is possible to provide a steel sheet that has a tensile strength of 700 MPa or more and has an excellent formability including a $r_{45}$ value of 1.20 or more and an ultimate deformability of 0.80 or more.

DESCRIPTION OF EMBODIMENT

The present inventors conducted studies and experiments about how to enhance an $r_{45}$ value and an ultimate deformability of a high-strength steel sheet having a tensile strength of 700 MPa or more and as a result found the following findings.

A steel having a predetermined chemical composition is subjected to a hot rolling step, where rolling conditions for three final stages including a final pass are controlled, so as to make shapes of austenitic grains flat prior to transformation. Subsequently, the steel is cooled and coiled at a low temperature, so as to cause bainite transformation or martensitic transformation. A hot-rolled sheet in which a {223}<252> orientation develops can be thereby provided. The resultant hot-rolled sheet is then subjected to cold-rolling step under appropriate conditions, so as to strengthen γ-fiber.

Here, the cold rolling puts a strain in a steel micro-structure, and if an excessive cold-rolling strain remains in a final steel micro-structure, the excessive strain results in deterioration in ultimate deformability. However, in the subsequent annealing step, by appropriately controlling its annealing temperature and a cooling rate in cooling performed thereafter, it is possible to avoid making a texture random, extremely strengthen γ-fiber, and in addition reduce the cold-rolling strain. Thereafter, by causing low-temperature transformation phases to precipitate, it is possible to provide a steel sheet that establishes compatibility between a high ultimate deformability and a high $r_{45}$ value and has a high strength.

The present invention is made based on the findings described above. Requirements of the present invention will be described below in detail.

(A) Chemical Composition

Reasons for limiting a content of each element are as follows. In the following description, the symbol "%" for contents means "mass %". In the present invention, it is assumed that a chemical composition of the steel sheet refers to an average chemical composition of a region of the steel sheet excluding a decarburized layer described later.

C: 0.03 to 0.25%

C (carbon) is an element necessary to ensure strength. If a content of C is less than 0.03%, it is not possible to provide a tensile strength of 700 MPa or more. On the other hand, if the content of C is more than 0.25%, martensite is excessively hardened, resulting in deterioration in toughness and loss of weldability. The content of C is therefore set to 0.03 to 0.25%. The content of C is preferably 0.05% or more, preferably 0.18% or less, more preferably 0.15% or less.

Si: 0.1 to 2.0%

Si (silicon) is an element that contributes to enhancement of strength. On the other hand, if Si is contained excessively, productivity is decreased in hot rolling due to poor descaling. A content of Si is thus set to 0.1 to 2.0%. In order to stabilize austenite in annealing and promote formation of low-temperature transformation phases in a cooling process for contribution to high strengthening, the content of Si is preferably 0.5% or more. Further, in order to produce retained austenite to enhance ductility, it is preferable that a total content of Si and Al described later be set to 1.0% or more.

Mn: 1.0 to 3.0%

Mn (manganese) has an effect of stabilizing austenite to facilitate formation of low-temperature transformation phases, contributing to ensuring strength. On the other hand, if Mn is contained excessively, a volume ratio of ferrite is decreased, resulting in deterioration in ductility. A content of Mn is thus set to 1.0 to 3.0%. The content of Mn is preferably 2.1% or more and preferably 2.8% or less.

P: 0.200% or Less

P (phosphorus) has an effect of increasing strength and may be therefore contained positively. However, if P is contained excessively, embrittlement due to grain-boundary segregation occurs; therefore, when P is to be contained, a content of P is set to 0.200% or less. The content of P is preferably 0.100% or less, more preferably 0.050% or less. It is not necessary to provide a lower limit to the content of P; the content of P may be 0%. However, an excessive reduction of the content of P results in an increase in produce costs; therefore, the content of P is preferably 0.001% or more. Note that P is usually mixed in at an impurity level of about 0.010% in a steel making stage.

S: 0.0500% or Less

S (sulfur) forms sulfide-based inclusions to decrease ductility; therefore, a content of S is kept to 0.0500% or less. In order to ensure excellent ductility, a content of S is preferably 0.0080% or less, more preferably 0.0030% or less.

Al: 0.01 to 1.00%

Al (aluminum) is an element used for deoxidation. However, if Al is excessively contained, it becomes difficult to perform continuous casting stably. A content of Al is set to 0.01 to 1.00%. A high content of Al destabilizes austenite at a high temperature, which necessitates raising a finish rolling temperature excessively in hot rolling; therefore, the content of Al is preferably set to 0.60% or less. In the present invention, the content of Al means the content of acid-soluble Al (sol.Al ). In order to produce retained austenite to enhance ductility, it is preferable that the total content of Al and Si described above be set to 1.0% or more.

N: 0.0100% or Less

N (nitrogen) is an element that disturbs a strength-ductility balance; therefore, a content of N is set to 0.0100% or less. The content of N is preferably 0.0060% or less. It is not necessary to provide a lower limit to the content of N; the content of N may be at an impurity level. N is usually mixed in at about 0.0020% in a steel making stage.

Ti: 0.01 to 0.25%

Ti (titanium) precipitates in a form of its carbide in a steel micro-structure of a hot-rolled sheet, having an effect of reducing dissolved carbon to make it easy to produce γ-fiber in a cold-rolled steel sheet. In addition, Ti has an effect of preventing recrystallization and coarsening of austenite to promote elongation of austenite in a hot-rolling step, making it easy to provide a {223}<252> orientation in a hot-rolled sheet. On the other hand, if Ti is contained excessively, Ti forms its coarse carbide or nitride in furnace heating before hot rolling, impairing a strength-ductility balance. A content of Ti is thus set to 0.01 to 0.25%. The content of Ti is preferably 0.02% or more, more preferably 0.03% or more, and is preferably 0.20% or less.

The steel sheet according to the present invention may be made to contain, in addition to the elements described above, one or more elements selected from Cr, Ni, Cu, Nb, V, Zr, Mo, W, Sn, Sb, Te, Ca, Mg, REM, and B.

Cr: 0.50% or less
Ni: 0.50% or less
Cu: 0.50% or less

Cr (chromium), Ni (nickel), and Cu (copper) each have an effect of increasing hardenability to produce martensite and/or bainite effectively; therefore Cr, Ni, and Cu may be each contained as necessary. However, if Cr, Ni, and Cu are contained excessively, production of ferrite is prevented; therefore, contents of these elements are each set to 0.50% or less. To provide the effect, it is preferable that one or more elements selected from the element described above be each contained at 0.10% or more.

Nb: 0.050% or Less

Nb (niobium) precipitates in a form of its carbide or nitride, having an effect of preventing recrystallization and coarsening of austenite to promote elongation of austenite in a hot-rolling step, making it easy to provide a {223}<252> orientation in a hot-rolled sheet. In addition, Nb has an effect of prevent recrystallization in annealing to prevent a texture from becoming random. Accordingly, Nb may be contained as necessary. On the other hand, if Nb is contained excessively, its coarse carbide is produced in a large amount in heating before hot rolling, impairing a strength-ductility balance; therefore, a content of Nb is set to 0.050% or less.

The content of Nb is preferably 0.030% or less. To provide the effect, the content of Nb is preferably set to 0.010% or more.

V: 0.15% or less
Zr: 0.15% or less
Mo: 0.15% or less
W: 0.15% or less

V (vanadium), Zr (zirconium), Mo (molybdenum), and W (tungsten) each have an effect of preventing recrystallization and coarsening of austenite to promote elongation, making it easy to provide a {223}<252> orientation in a hot-rolled sheet; therefore, V, Zr, Mo, and W may be each contained as necessary. On the other hand, if V, Zr, Mo, and W are contained excessively, V, Zr, Mo, and W each form its coarse carbide, not only impairing a strength-ductility balance, but also resulting in increase in alloy costs. Contents of these elements are each set to 0.15% or less, preferably 0.12% or less. To provide the effect, it is preferable that one or more elements selected from the element described above be each contained at 0.01% or more.

One or More Elements Selected from Sn, Sb, and Te: 0.100% or Less in Total

Sn (tin), Sb (antimony), and Te (tellurium) segregates at a surface of the steel, having an effect of preventing decarburization of an outer layer of the steel sheet to prevent strength from being decreased in an annealing step. Further, in a case where formation of a decarburized layer on the outer layer of the steel sheet is positively intended, containing these elements enables prevention of excessive decarburization by breakaway oxidation. Therefore, one or more elements selected from Sn, Sb, and Te may be contained as necessary. However, if Sn, Sb, and Te are contained excessively, Sn, Sb, and Te segregate at grain boundaries to decrease toughness; therefore, a total content of these elements is set to 0.100% or less, preferably 0.050% or less. To provide the effect, it is preferable that these elements be contained at a content of 0.005% or more in total.

One or More Elements Selected from Ca, Mg, and REM: 0.0050% or Less in Total

Ca (calcium), Mg (magnesium), and REM (rare-earth metal) refine oxides and nitrides that precipitate during solidification, having an effect of keeping soundness of a cast piece; therefore, Ca, Mg, and REM may be each contained as necessary. However, these elements are all expensive; therefore, a total content of these elements is set to 0.0050% or less. To provide the effect, it is preferable that these elements be contained at a content of 0.0005% or more in total.

Here, REM refers to 17 elements including Sc (scandium), Y (yttrium), and lanthanoids. The content of REM means a total content of these elements. Industrially, REM is added in a form of misch metal.

B: 0.0050% or Less

B (boron) has an effect of preventing recrystallization and coarsening of austenite to promote elongation, making it easy to provide a {223}<252> orientation in a hot-rolled sheet; therefore, B may be contained as necessary. In addition, B has an effect of raising a recrystallization temperature in annealing to prevent a texture from becoming random; therefore, B may be added as necessary. On the other hand, if B is contained excessively, cracking occurs on a surface of the steel material in casting, impairing productivity; therefore, an upper limit of a content of B is set to 0.0050% or less. The content of B is preferably 0.0040% or less, more preferably 0.0020% or less. To provide the effect, it is preferable that B be contained at a content of 0.0005% or more.

In the chemical composition of the steel sheet according to the present invention and a member formed from the steel sheet, the balance is Fe and impurities. Note that the term "impurities" means components that are mixed in steel in producing the steel industrially from raw materials such as ores and scraps and due to various factors in the producing process, and are allowed to be mixed in the steel within their respective ranges in which the impurities have no adverse effect on the present invention.

(B) Steel Micro-Structure

A steel micro-structure of the steel sheet according to the present invention will be described below. In the following description, the symbol "%" for area fractions means "area %".
Ferrite: 50 to 85%
Ferrite is a steel micro-structure necessary for enhancing $r_{45}$ value and exerting ductility. On the other hand, if an area fraction of ferrite in the steel micro-structure is excessive, it becomes not possible to provide a tensile strength of 700 MPa or more. The area fraction of ferrite is thus set to 50 to 85%. To exert more favorable ductility, the area fraction of ferrite is preferably 55% or more, more preferably 60% or more. On the other hand, from a viewpoint of enhancing strength, the area fraction of ferrite is preferably 80% or less.

Note that, in the present invention, the ferrite includes polygonal ferrite as well as granular bainitic ferrite and acicular ferrite that precipitate at a low temperature.

In the steel micro-structure of the steel sheet according to the present invention, the balance, which is other than the ferrite, includes one or more types selected from martensite, bainite, and retained austenite. By making the balance of the steel micro-structure consist of one or more types selected from martensite, bainite, retained austenite, which are hard phases, it is possible to provide a tensile strength of 700 MPa or more. Note that the martensite includes martensite-austenite constituent (MA).

Note that, in the present invention, the martensite and the bainite include as-quenched martensite and as-quenched bainite as well as tempered martensite and tempered bainite, respectively.

The area fraction of ferrite and the steel micro-structure constituting the material are determined by structure observation under a scanning electron microscope (SEM). A cross section of the steel sheet is subjected to mirror polish, and then its microstructure is made to appear with 3% Nital (3% nitric acid-ethanol solution). The microstructure is observed within a range 40 μm long (length in a sheet thickness direction)×40 μm wide (length in a rolling direction) at a ½ depth position in a sheet thickness from the surface of the steel sheet, under the SEM at a magnification of 3000×, by which area fractions of micro-structures can be measured.

Presence of retained austenite can be checked by the X-ray diffraction method. First, from the steel sheet, a specimen that is 25 mm wide (length in the rolling direction) and 25 mm long (length in a direction perpendicular to the rolling direction) and has the same thickness as the steel sheet is cut. The specimen is then subjected to chemical polishing to have its thickness so reduced that the ½ depth position in the sheet thickness is reached, by which a specimen having a chemical-polished surface is provided. The surface of the specimen is subjected to the X-ray diffraction analysis using a Co tube with a measurement range 2θ of 45 to 105°.

Presence/absence of retained austenite can be checked from presence/absence of some or all of diffraction peaks from (111), (200), and (220).

(C) Texture

Intensity of γ-Fiber: More than 4.0 Times in Terms of Random Intensity Ratio

The intensity of γ-fiber means an intensity on a {111} plane facing a normal direction of a rolled surface. To achieve a high $r_{45}$ value, the intensity of γ-fiber is set to more than 4.0 times in terms of the random intensity ratio. The intensity of γ-fiber is preferably set to 6.0 or more in terms of the random intensity ratio.

The intensity of γ-fiber is measured by the following procedure. First, a cross section of the steel sheet that is parallel to the rolling direction (RD) and the sheet thickness direction (ND) is made to appear, and a crystal orientation is measured at 1.00 μm intervals in a 500 μm×200 μm region at a ½ depth position in a sheet thickness by the scanning electron microscope-electron backscatter diffraction (SEM-EBSD) method. Next, based on the resultant crystal orientation data, an inverse pole figure in the ND direction is calculated by the spherical harmonics expansion, and the intensity of γ-fiber is determined from an intensity at a (111) pole. The inverse pole figure is calculated by the spherical harmonics expansion with an order of its series expansion being set to 22 and without additional smoothing such as a Gaussian distribution.

Average KAM Value of Grains Having Crystal Orientations that Form Angles Within 10° from γ-Fiber: 1.30° or Less In the present invention, since the steel contains Ti, improper annealing conditions cause a cold-rolling strain to remain excessively, resulting in decrease in ultimate deformability. For that reason, it is necessary to reduce the cold-rolling strain in a final steel micro-structure.

A degree of the cold-rolling strain remaining can be determined by a local orientation analysis via the SEM-EBSD method. In the SEM-EBSD, a sample is irradiated with electron beams at certain intervals, and the resultant pseudo Kikuchi pattern is analyzed to identify a crystal orientation at a measurement point. When a cold-rolling strain remains in a grain, there is a fluctuation in orientation in the grain, which can be detected as a change in orientation between adjacent points of the measurement by the SEM-EBSD method.

An index that indicates a degree of such variations in crystal orientation between a certain measurement point in a grain and points around the measurement point is a kernel average misorientation (KAM) value. Determination of a KAM value requires an angle threshold that ensures a measurement region, a measurement interval, sizes of regions to be compared with, and comparison within a single grain. In the present invention, measurement is performed in a 100 μm×200 μm region at intervals of 0.05 μm to 0.10 μm, and regions within a radius of 0.20 μm from each measurement point are used to measure a KAM value. Note that the angle threshold is set to 5°.

As a result of such an experiment and an analysis, the present inventors found that an average KAM value of grains included in γ-fiber plays an important role in enhancing ultimate deformability while providing a high $r_{45}$ value. Specifically, an ultimate deformability as excellent as 0.80 or more can be provided by controlling a texture such that an average KAM value of grains having crystal orientations that form angles within 10° from γ-fiber falls within 1.30°.

(D) Decarburized Layer

The steel sheet according to the present invention may include a decarburized layer on its outer layer. By making the steel sheet include a soft decarburized layer on its outer layer, it is possible to further enhance flexural properties of the steel sheet. In particular, by forming a decarburized layer having a thickness of 4.0 μm or more in a depth direction from a surface of the steel sheet, it is possible to provide flexural properties so excellent that cracking will not occur on a bending ridge even under a stringent formation condition that a ratio (Rp/t) of a bending radius (Rp)/sheet thickness (t) of the steel sheet is 0.5. The thickness of the decarburized layer is preferably 5.0 μm or more, more preferably 6.0 μm or more.

Note that the decarburized layer may be formed on only an outer layer on any one of sides in the thickness direction or may be formed on outer layers on both sides. However, if the thickness of the decarburized layer is excessively large, it becomes difficult to ensure a strength of the steel sheet as a whole. It is therefore preferable that the thickness of the decarburized layer be set to 20% or less of the entire thickness of the steel sheet in total for the outer layers on both sides. In a case where an importance is placed on a strength of the steel sheet, the thickness of the decarburized layer is preferably set to 20 μm or less per side, more preferably 15 μm or less per side.

In a case where an importance is further placed on the strength of the steel sheet, it is preferable not to form the decarburized layer. The steel sheet according to the present invention can provide flexural properties so excellent that cracking will not occur on a bending ridge as long as a formation condition is such that Rp/t is 1.0 even when the steel sheet includes no decarburized layer.

Here, in the present invention, the thickness of the decarburized layer refers to an average value of shortest distances between the surface of the steel sheet to hard phases when the steel micro-structure is identified from the surface of the steel sheet in the depth direction. Specifically, the thickness of the decarburized layer is measured by the following procedure. First, a cross section of the steel sheet that is parallel to the rolling direction and the thickness direction of the steel sheet is cut, subjected to mirror polish, and then subjected to Nital etching, by which its steel micro-structure is made to appear. Subsequently, structure observation is performed under a SEM, which gives a SEM image of a steel micro-structure on a cross section in a vicinity of the outer layer photographed at a magnification of 1000×.

Figure 1:
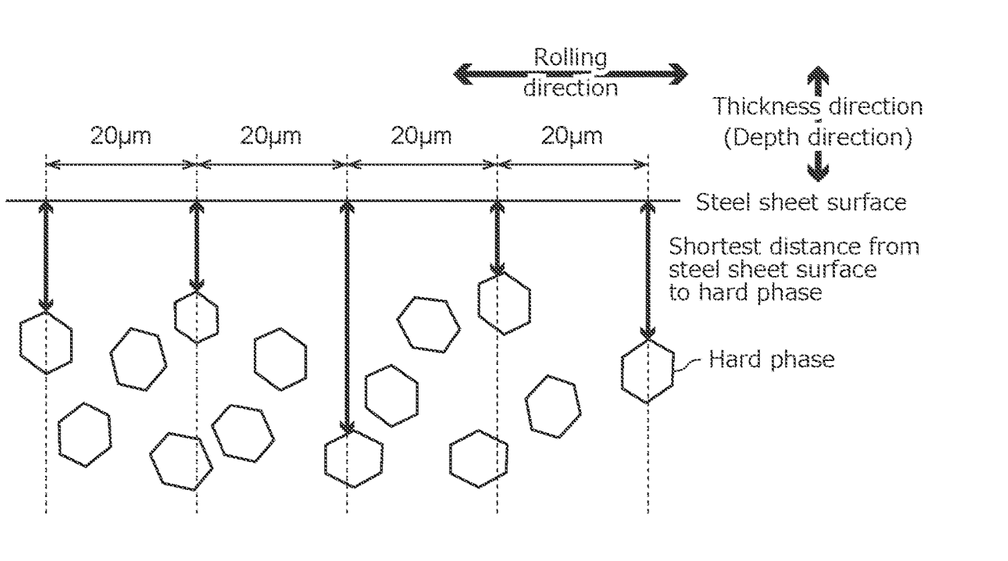
FIG. 1 is a schematic diagram for describing how to measure shortest distances from a surface of a steel sheet to hard phases.

FIG. 1 is a schematic diagram for describing how to measure the shortest distances from the surface of the steel sheet to hard phases. As illustrated in FIG. 1, on the resultant SEM image, five lines extending in the thickness direction are drawn at 20 μm intervals in the rolling direction, and on each line, the shortest distance from the surface of the steel sheet to a hard phase is measured. Then, an average value of the resultant five measurement values is taken as the thickness of the decarburized layer. Note that, in the present invention, the hard phases include martensite, tempered martensite, bainite, and retained austenite.

(E) Thickness

There is no particular limit on the thickness of the steel sheet according to the present invention; however, in a case where the steel sheet is to be used as a starting material for a covering member such as a door and a hood, the thickness of the steel sheet is preferably 0.1 to 2.0 mm, more preferably 0.2 to 1.5 mm, still more preferably 0.3 to 1.0 mm.

(F) Method for Producing Steel Sheet

According to findings about an ultra-low carbon steel such as an IF steel, in order to strongly develop γ-fiber, which is of advantage for the r value, in general, a cold rolling reduction is increased to develop γ-fiber, and in addition, γ-fiber is strengthened through recrystallization in annealing.

However, for a high-strength steel, which is relatively rich in dissolved carbon, a high rolling reduction causes a shear band to be formed in cold rolling, and the shear band makes the texture random or causes orientations that are disadvantageous to the r value to develop in annealing, weakening γ-fiber formed by the cold rolling.

In the present invention, in order to prevent the formation of the shear band, the cold rolling is performed at a low rolling reduction, and in addition, a favorable texture is formed in a hot-rolled sheet so that γ-fiber will be strengthened even under a condition of a low rolling reduction. Specifically, a texture in the hot-rolled sheet is controlled so that a {223}<252> orientation develops at a stage where the steel sheet is a hot-rolled sheet and so that γ-fiber is produced even under a condition of a low rolling reduction.

In order to prevent the texture in which γ-fiber is strengthened through the cold rolling from being impaired as much as possible by annealing, it is necessary to control cold rolling conditions and annealing conditions so that the texture is preferably strengthened.

An example of a method for producing the steel sheet according to the present invention will be described below in detail. The steel sheet according to the present invention can be provided by, for example, a producing method including the following steps.

<Slab Producing Step>

A casting product to be subjected to hot rolling may be produced by a conventional method. That is, a slab obtained by continuous casting or casting and blooming, or a steel obtained by strip casting can be used.

<Hot-Rolling Step>

The casting product is subjected to the hot rolling. In order to cause the {223}<252> orientation to develop in a hot-rolled sheet, it is necessary to define conditions for a hot-rolling step as well as a coiling step described later. Specifically, it is important to cause a rolling texture to develop in austenite before transformation as well as to elongate a shape of the texture. Conditions for the hot-rolling step will be described below in detail.

Heating Temperature: 1050 to 1300° C.

In order to dissolve Ti in the steel, a heating temperature before the hot rolling is set to 1050° C. or more. On the other hand, the heating temperature is preferably set to 1300° C. or less in view of a durability of a heating furnace.

Total rolling reduction: 40% or more of a total rolling reduction in final three stages in terms of a rate of reduction in sheet thickness.

In order to cause the texture in the hot-rolled sheet to develop, it is preferable that a total rolling reduction in the final three straight stages including a final finishing rolling stand be set to 40% or more in terms of a rate of reduction in sheet thickness. Further, rolling in at least the final three stages including a final stand is performed at a temperature within 100° C. from a finish rolling temperature.

Rolling Reduction in Each Pass: 1.2 or More in Terms of Effective Rolling Index

If recrystallization of austenite proceeds excessively between passes in the hot rolling, the texture is weakened, and at the same time, grains become equiaxed, resulting in a failure to provide a hot-rolled sheet having a desired texture. That is, in order to cause the {223}<252> orientation to develop in the hot-rolled sheet, it is preferable to cause a texture in austenite to develop.

However, even when the rolling is performed in the manner described above, if a rolling reduction in a single stage is high, or if an amount of a cumulative strain caused by multistage rolling is sufficient to cause recrystallization, austenite becomes equiaxed, the resultant texture is weakened, and as a result, a texture of ferrite after cooling is weakened. As a result of further studies, the present inventors found that a combination for enhancing the texture in the rolling step in the final three stages and elongating grains at the same time can be determined by the following method.

First, of stands in the final three stages, consider a stand (F1) that performs the rolling first; from a relation among a content of Ti (mass %) contained in the steel, a rolling strain in F1, and a finish rolling temperature FT (° C.), a value $dT_{\textit{eff-p}}$, which relates to a time taken by 50% of austenite to be recrystallized after the rolling by F1, is determined.

[Expression 1]

$$dT_{\textit{eff-p}} = K \times 1.60 \times 10^{-15} \times \left( \ln\left(\frac{t_{F1}}{t_{ini}}\right) \right)^{-4} \times Q\textit{eff} \quad \text{(i)}$$

[Expression 2]

$$K = \exp(10.2 \times W_{Ti}) \quad \text{(ii)}$$

[Expression 3]

$$Q\textit{eff} = \exp\left(\frac{71700}{1.98721 \times (FT + 273)}\right) \quad \text{(iii)}$$

Here, $t_{ini}$ denotes a sheet thickness (mm) on an entrance side of F1, and $t_{F1}$ denotes a sheet thickness (mm) after the rolling by F1. $W_{Ti}$ denotes the content of Ti (mass %) contained in the steel.

When $dT_{\textit{eff-p}}$ is more than 2.0, it is determined that recrystallization does not occur in F1, and a value $dT_{\textit{eff-s-a}}$, which relates to a time taken by 50% of austenite to be recrystallized after the rolling by F2, is determined from a cumulative rolling strain up to F2 by Formula (iv) shown below.

[Expression 4]

$$dT_{\textit{eff-s-a}} = K \times 1.60 \times 10^{-15} \times \left( \ln\left(\frac{t_{F2}}{t_{ini}}\right) \right)^{-4} \times Q\textit{eff} \quad \text{(iv)}$$

Here, $t_{F2}$ denotes a sheet thickness (mm) after the rolling by F2.

On the other hand, when $dT_{\textit{eff-p}}$ is 2.0 or less, it is determined that recrystallization occurs in F1, and a value equivalent to $dT_{\textit{eff-s-a}}$ is determined as $dT_{\textit{eff-s-b}}$ from a rolling strain in F2 alone by Formula (v) shown below.

[Expression 5]

$$dT_{\textit{eff-s-b}} = K \times 1.11 \times 10^{-15} \times \left( \ln\left(\frac{t_{F2}}{t_{F1}}\right) \right)^{-4} \times Q\textit{eff} \quad \text{(v)}$$

From the value of $dT_{\textit{eff-s-a}}$ or $dT_{\textit{eff-s-b}}$ determined in the manner described above, whether recrystallization will occur after F2 is determined, and the effective rolling index is determined as follows. That is, when $dT_{\textit{eff-s-a}}$ is more than 2.0, it is determined that recrystallization does not occur in F1 and F2, and an effective rolling index $C_{\textit{eff-t-a}}$ is determined from a cumulative rolling strain from F1 to F3 by Formula (vi) shown below.

[Expression 6]

$$C_{\textit{eff-t-a}} = K \times 1.60 \times 10^{-15} \times \left( \ln\left(\frac{t_{F3}}{t_{ini}}\right) \right)^{-4} \times Q\textit{eff} \times \ln\left(\frac{t_{ini}}{t_{F3}}\right) \quad \text{(vi)}$$

Here, $t_{F3}$ denotes a sheet thickness (mm) after the rolling by F3.

On the other hand, when $dT_{\textit{eff-s-a}}$ is 2.0 or less, it is determined from the cumulative strain up to F2 that recrystallization occurs between F2 and F3, and an effective rolling index $C_{\textit{eff-t-b}}$ is determined from the rolling strain in F3 alone by Formula (vii) shown below.

[Expression 7]

$$C_{\textit{eff-t-b}} = K \times 1.11 \times 10^{-15} \times \left( \ln\left(\frac{t_{F3}}{t_{F2}}\right) \right)^{-4} \times Q\textit{eff} \times \ln\left(\frac{t_{F2}}{t_{F3}}\right) \quad \text{(vii)}$$

Further, when $dT_{\textit{eff-s-b}}$ is more than 2.0, an effective rolling index $C_{\textit{eff-t-c}}$ is determined from the cumulative rolling strain in F2 and F3 by Formula (viii) shown below.

[Expression 8]

$$C_{\textit{eff-t-c}} = K \times 1.11 \times 10^{-15} \times \left( \ln\left(\frac{t_{F3}}{t_{F1}}\right) \right)^{-4} \times Q\textit{eff} \times \ln\left(\frac{t_{F1}}{t_{F3}}\right) \quad \text{(viii)}$$

On the other hand, when $dT_{\textit{eff-s-b}}$ is 2.0 or less, it is determined that recrystallization occurs after the rolling by F2, and an effective rolling index $C_{\textit{eff-t-b}}$ is calculated by Formula (vii) above.

Note that, in a case where one or more elements selected from Ti, Nb, V, Mo, W, and Zr are contained in the steel, a K value is determined by Formula (ix) shown below in place of Formula (ii) above.

[Expression 9]

$$K = \exp(2.0 \times (W_{Mo} + W_V + W_W + W_{Zr}) + 10.2 \times W_{Ti} + 62.5 \times W_{Nb}) \quad \text{(ix)}$$

Here, $W_{Mo}$, $W_V$, $W_W$, $W_{Zr}$, and $W_{Nb}$ denotes contents (mass %) of Mo, V, W, Zr, and Nb contained in the steel, respectively, and when each of Mo, V, W, Zr, and Nb is not contained, zero is substituted into the corresponding one of $W_{Mo}$, $W_V$, $W_W$, $W_{Zr}$, and $W_{Nb}$, respectively.

By controlling the hot rolling so that the effective rolling index determined by the procedure described above is 1.2 or more, austenitic grains that are elongated in the rolling direction and in which the texture develops sufficiently is provided effectively. It is preferable to control hot rolling conditions so that the effective rolling index is 10.0 or more.

Finish Rolling Temperature: 800 to 1000° C.

If the finish rolling temperature is more than 1000° C., there is a risk that a surface quality may deteriorate due to a scale defect. The finish rolling temperature of the hot rolling is therefore set to 1000° C. or less, preferably 980° C. or less. On the other hand, if the finish rolling temperature is less than 800° C., there is a risk that productivity may be impaired due to increase in rolling load. The finish rolling temperature of the hot rolling is therefore set to 800° C. or more, preferably 850° C. or more.

Cooling Start Time: More than 0.5 s to 2.0 s or Less

After the rolling is ended, cooling is performed before recrystallization of austenite is completed. To this end, a time from an end of a final rolling until a start of the cooling is set to 2.0 s or less. On the other hand, if the cooling start time is excessively short, ferrite is produced from a shear band formed in austenite by the hot rolling serving as a nucleus, which makes a steel micro-structure of the resultant hot-rolled sheet mainly contain ferrite, resulting in a failure to make the steel micro-structure mainly contain bainite. The cooling start time is thus set to more than 0.5 s. Note that the cooling here means an accelerated cooling by water cooling or the like.

Cooling Rate: 15° C./s or More

In order to cause the {223}<252> orientation to develop, it is important to cause bainite transformation or martensitic transformation. Thus, a cooling rate after the rolling is set to 15° C./s or more, preferably 30° C./s or more. Note that the cooling rate after the rolling means an average cooling rate obtained by dividing a difference between a temperature at a time of starting the cooling after the end of the final rolling and a coiling temperature described below by a time taken to make the difference in temperature.

<Coiling Step>

Coiling Temperature: 300° C. or More to Less than 600° C.

In order to cause the {223}<252> orientation to develop, it is necessary to cause bainite transformation or martensitic transformation; therefore, coiling is performed at a temperature less than 600° C. On the other hand, if the coiling temperature is excessively low, a load of the cold rolling is increased, which may impair productivity; therefore, a lower limit of the coiling temperature is set to 300° C. In view of controllability of the temperature in the cooling after the hot rolling, the coiling temperature is preferably set to 480° C. or more. From a viewpoint of reducing the load in the cold rolling, the coiling temperature is more preferably set to 500° C. or more.

In the texture of the hot-rolled sheet provided in this manner, the intensity of the {223}<252> orientation is 5.0 times or more in terms of the random intensity ratio. Under preferable conditions, an intensity of 6.0 times or more in terms of the random intensity ratio can be provided.

The steel micro-structure of the hot-rolled sheet mainly contains bainite. Although there is a case where martensite and/or retained austenite is mixed in part of the steel micro-structure, the mixing in is allowed because it does not impair cold rolling properties as long as a total area fraction of the martensite and/or retained austenite is 30% or less.

<Hot-Rolled Sheet Annealing Step>

Hot-Rolled Sheet Annealing Temperature: 600° C. or Less

For reducing the load in the cold rolling under constraints of equipment, the hot-rolled sheet may be subjected to heat treatment. The texture of the hot-rolled sheet will not be broken significantly as long as α-γ transformation will not occur, but it is preferably to set the hot-rolled sheet annealing temperature to 600° C. or less in view of increase in annealing costs.

<Cold-Rolling Step>

Cold Rolling Reduction: 40 to 85%

By adding cold rolling after the hot rolling, γ-fiber, which is of advantage for enhancing the $r_{45}$ value, is strengthened. That is, in order to cause the {223}<252> orientation in the hot-rolled sheet to turn to an orientation of γ-fiber, the cold rolling is performed at a cold rolling reduction of 40% or more. The cold rolling reduction is preferably set to 50% or more. On the other hand, if the cold rolling reduction is excessively high, discontinuous recrystallization becomes strong, making the texture random attributable to a shear band; therefore, the cold rolling reduction is set to 85% or less. In view of decrease in productivity due to increase in a load in the cold rolling, the cold rolling reduction is preferably set to 80% or less. The cold rolling reduction is more preferably 75% or less.

<Annealing Step>

As described above, if the discontinuous recrystallization occurs, the texture tends to be random. Therefore, annealing conditions are controlled not to cause the discontinuous recrystallization excessively, promoting continuous recrystallization to inherit γ-fiber formed by the cold rolling after the annealing, and phase transformation is utilized to strengthen γ-fiber. Conditions for each stage will be described in detail.

Heating Rate: 2° C./s or More

If the heating rate is low, discontinuous recrystallization of ferrite proceeds prominently in heating, making γ-fiber less likely to be strengthened. The heating rate is thus set to 2° C./s or more. A particular upper limit of the heating rate is not regulated; however, the heating rate is preferably set to 30° C./s or less in view of controllability of temperature. Note that the heating rate means an average heating rate obtained by dividing a difference between a temperature (room temperature) at a time of starting the heating and the following annealing temperature by a time taken to make the difference in temperature.

Annealing Temperature: A Condition Satisfying Formula (x) Shown Below

The annealing temperature (RHT) is a condition that satisfies Formula (x) shown below. Here, $Ac_1$ denotes a temperature at which transformation from ferrite to austenite (α-γ transformation) starts, and $Ac_3$ denotes a temperature at which the α-γ transformation is completed to produce an austenite single phase; $Ac_1$ and $Ac_3$ are calculated by Formula (xi) and Formula (xii) shown below, respectively.

[Expression 10]

$$0.40 \leq (RHT - Ac_1)/(Ac_3 - Ac_1) \leq 0.85 \qquad \text{(x)}$$

[Expression 11]

$$\ln(Ac_1) = 6.5792 - 0.038058 \times C + 0.052317 \times Si + \qquad \text{(xi)}$$
$$0.011872 \times Ni - 0.045575 \times V + 0.18057 \times Al + 0.011442 \times W -$$
$$0.013403 \times Cu + 5.5207 \times B + 0.91209 \times S - 1.1002 \times P +$$
$$0.060014 \times Mn \times C - 0.096628 \times Cr \times C + 0.050625 \times Cr \times Si +$$
$$0.39802 \times Mo \times C - 0.34782 \times Mo \times Mn + 0.40986 \times Mo \times Si -$$
$$0.12959 \times Mo \times Cr - 0.048128 \times Ni \times C - 0.01090 \times Mn^2 -$$
$$0.03550 \times Si^2 + 0.010207 \times Cr^2 + 0.36074 \times Mo^2 - 0.0030705 \times Ni^2$$

-continued

[Expression 12]

$$\ln(Ac_3) = 6.8165 - 0.47132 \times C - 0.057321 \times Mn +$$ (xii)
$$0.066020 \times Si - 0.050211 \times Cr - 0.094455 \times Ni + 0.10593 \times Ti -$$
$$0.014847 \times W + 2.0272 \times N + 1.0536 \times S - 0.12024 \times Si \times C +$$
$$0.11629 \times Cr \times C - 0.30451 \times Mo \times Mn + 0.68229 \times Mo \times Si -$$
$$0.21210 \times Mo \times Cr + 0.12470 \times Ni \times C + 0.069960 \times Ni \times Mn +$$
$$0.014003 \times Ni \times Cr + 0.29225 \times C^2 + 0.015660 \times Mn^2 +$$
$$0.017315 \times Cr^2 + 0.46894 \times Mo^2 + 0.0027897 \times Ni^2$$

If RHT is so low that a value of $(RHT-Ac_1)/(Ac_3-Ac_1)$ falls below the left side value of Formula (x), an amount of austenite that undergoes reverse transformation is not sufficient, which makes it less likely to provide an effect in which austenite encroaches on discontinuously recrystallized ferrite having random orientations that is produced unavoidably in carbide or a high strain region around a hard phase. In addition, a rolling strain introduced by the cold rolling remains in the steel micro-structure, impairing an ultimate deformability and a strength-ductility balance.

On the other hand, if RHT is so high that the value of $(RHT-Ac_1)/(Ac_3-Ac_1)$ exceeds the right side value of Formula (x), an excess of reverse-transformed austenite is produced, new nucleation of ferrite becomes prominent in a cooling process, which makes the texture random, gradually weakening γ-fiber. Thus, RHT is determined so that the value of $(RHT-Ac_1)/(Ac_3-Ac_1)$ is 0.40 to 0.85.

In a case where γ-fiber is further strengthened to provide a particularly excellent $r_{45}$ value, the value of $(RHT-Ac_1)/(Ac_3-Ac_1)$ is preferably set within the range of 0.50 to 0.80, more preferably set within the range of 0.60 to 0.75.

Annealing Atmosphere

The annealing is preferably performed in a reducing atmosphere in which a hydrogen concentration is 2% or more in volume fraction, and a dew point is less than −30° C. If the hydrogen concentration is less than 2%, an oxide film on a surface of a blank steel sheet cannot be reduced sufficiently, which impairs plating wettability when hot-dip galvanizing treatment is performed. An annealing furnace includes regions including a heating zone where the steel sheet is heated to a predetermined annealing temperature and a holding zone where the steel sheet is held at the annealing temperature.

In a case where the formation of the decarburized layer described above on the outer layer of the steel sheet is intended, an atmosphere in the heating zone in a heating step is made to have a hydrogen concentration of 20% or less in volume fraction and a dew point of −30° C. or more to 20° C. or less. If the dew point is less than −30° C., the thickness of the decarburized layer falls below 5 μm, resulting in a failure to provide a sufficient effect for enhancing flexural properties. On the other hand, if the dew point is more than 20° C., condensation occurs in the equipment, impairing productivity. If the hydrogen concentration is more than 20% in volume fraction, it is difficult to keep the dew point to 20° C. or less, which causes the condensation to occur in the equipment as described above, impairing productivity.

Annealing Holding Duration: 30 s or More

If the annealing holding duration is short, the α-γ transformation does not proceed sufficiently, and a cold-rolling strain remains in ferrite, impairing the strength-ductility balance. Thus, the annealing holding duration is set to 30 s or more, preferably 60 s or more. A particular upper limit of the annealing holding duration is not regulated; however, the annealing holding duration is preferably set to 1000 s or less in view of productivity, more preferably set to 800 s or less.

Cooling Conditions After Annealing

In cooling after the annealing, first cooling for adjusting the area fraction of ferrite and formulating the texture, and second cooling for forming hard phases are performed. Further, in the first cooling, ferrite grains having the orientation of γ-fiber that is inherited from the cold-rolled sheet by the continuous recrystallization can be made to transform and grow into adjacent austenite, strengthening γ-fiber in the entire steel micro-structure.

First Cooling Rate: 3 to 30° C./s

Ferrite is caused to precipitate by first cooling. If an average cooling rate of the first cooling (first cooling rate) is excessively low, pearlite transformation occurs from austenite, impairing strength. The first cooling rate is thus set to 3° C./s or more, preferably 5° C./s or more. On the other hand, if the first cooling rate is excessively high, transformation involving new nucleation occurs, which makes strengthening of γ-fiber by grain growth insufficient. The first cooling rate is thus set to 30° C./s or less.

Although an end temperature of the first cooling is not limited to a particular temperature, if the end temperature is excessively low, an excess of ferrite is produced, reducing a proportion of hard phases to decrease strength; therefore, the end temperature is preferably set to 600° C. or more.

Second Cooling Rate: 30° C./s or More

Subsequent to the first cooling, second cooling is performed. If an average cooling rate of the second cooling (second cooling rate) is excessively low, untransformed austenite undergoes pearlite transformation, which reduces hard phases to decrease strength. The second cooling rate is thus set to 30° C./s or more. Although there is no need to limit an upper limit of the second cooling rate to a particular rate, it is difficult for typical equipment to achieve a cooling rate more than 250° C./s; therefore, the second cooling rate is preferably set to 250° C./s or less.

Although there is no particular limit on a stop temperature of the second cooling, the stop temperature is preferably set to a temperature of not more than an overaging temperature described later. For example, the second cooling may be stopped at the overaging temperature, and an overaging step may be subsequently performed, or the overaging step may be performed after cooling to a room temperature and reheating. In a case where the overaging step is not performed, it is preferable to perform cooling to a room temperature.

<Overaging Step>

Overaging Temperature: 550° C. or Less

After the annealing step, overaging treatment may be performed as necessary. However, if the overaging treatment is performed at a temperature more than 550° C., hard phases are softened, decreasing strength; therefore, the overaging temperature is preferably set to 550° C. or less. In a case where the second cooling is performed to a temperature lower than the overaging temperature, a heating rate for reheating to the overaging temperature is not limited to a particular heating rate; however, the heating rate is preferably set to 2° C./s or more. Although there is no particular limit on a cooling rate after the overaging treatment, either; however, the cooling rate is preferably set to 30° C./s or more.

<Hot-Dip Galvanizing Step (GI)>

After the annealing, hot-dip galvanizing may be performed as necessary. As a kind of the hot-dip galvanizing, a coating of Zn, a Zn—Al alloy, an Al—Si alloy, an Fe—Zn alloy, or the like may be applied to the surface of the steel sheet. As a composition of a plating bath for the Zn—Al alloy, for example, a Zn-(0.1 to 60)% Al bath, a bath in which Si and/or Mg are added in combination, or the like can be used.

As a composition of a plating bath for the Al—Si alloy, Al-(7 to 13)% Si bath or the like can be used. A plating bath may additionally contain one or more elements selected from Fe, V, Mn, Ti, Nb, Ca, Cr, Ni, W, Cu, Pb, Sn, Cd, and Sb at 0.1% or less with no problem.

Although a temperature range of the plating bath is not limited to a particular temperature, the temperature may be selected from a temperature range of 430 to 500° C., which is a normal temperature range, preferably a temperature range of 440 to 480° C., as appropriate.

<Hot-Dip Galvannealing Step (GA)>

After the hot-dip galvanizing step, alloying treatment may be performed to galvanneal the surface of the steel sheet. In this case, the alloying treatment is preferably performed within a temperature range of 450 to 600° C. If a temperature of the alloying treatment is less than 450° C., interdiffusion of elements is less likely to occur between the steel material and a molten metal, and there is a risk that the galvannealing does not proceed sufficiently. On the other hand, if the alloying treatment is performed at a temperature more than 600° C., th galvannealing proceeds excessively, causing a concern that separation of plating may occur due to embrittlement of a plating layer, and at the same time, the hard phases are tempered to impair strength. In order to perform the alloying treatment stably, an alloying treatment duration is preferably set to 10 s or more.

The present invention will be described below more specifically with reference to examples, but the present invention is not limited to these examples.

EXAMPLE 1

Steels having chemical compositions shown in Table 1 were melted in a vacuum furnace, reheated to 1050° C. or more, and then subjected to hot rolling with a small hot rolling mill for test, under conditions shown in Table 2. In all examples, the rolling in the final three stages was ended within a temperature range from the finish rolling temperature to (the finish rolling temperature +100° C.). After the hot rolling, the coiling step with an actual machine was simulated in such a manner that the steels were subjected to water cooling with a water cooling apparatus placed immediately after the roll stands, subsequently charged into a heating furnace that was set to a temperature equivalent to a temperature of the coiling, held for 30 minutes, and then subjected to slow cooling at 20° C./h to a room temperature.

TABLE 1

| Steel | Chemical composition (in ras %, balance: Fe and impurities) | | | | | | | | | | |
|---|---|---|---|---|---|---|---|---|---|---|---|
|  | C | Si | Mn | P | S | Al | N | Ti | Cr | Ni | Cu |
| A | 0.07 | 1.2 | 2.5 | 0.008 | 0.0010 | 0.03 | 0.0028 | 0.13 | | | |
| B | 0.05 | 0.5 | 0.5 | 0.002 | 0.0010 | 0.12 | 0.0030 | 9.10 | | | |
| C | 0.08 | 0.6 | 2.2 | 0.009 | 0.0010 | 0.03 | 0.0032 | 6.02 | | | |
| D | 0.11 | 0.6 | 1.8 | 0.010 | 0.0012 | 0.03 | 0.0030 | 0.13 | 0.15 | | |
| E | 0.11 | 0.5 | 2.5 | 0.009 | 0.0010 | 0.30 | 0.0029 | 0.02 | | | |
| F | 0.18 | 1.5 | 2.6 | 0.012 | 0.0010 | 0.30 | 0.0024 | 0.02 | | | |
| G | 0.02 | 0.1 | 1.5 | 0.100 | 0.0016 | 0.03 | 0.0028 | | 0.31 | | |
| H | 0.04 | 0.7 | 2.1 | 0.002 | 0.0010 | 0.04 | 0.0030 | 0.03 | | | |
| I | 0.31 | 2.2 | 2.1 | 0.020 | 0.0470 | 0.04 | 0.0040 | | | | |
| J | 0.18 | 1.6 | 2.0 | 0.003 | 0.0010 | 0.40 | 0.0030 | | | | |
| K | 0.18 | 1.6 | 0.9 | 0.004 | 0.0010 | 0.40 | 0.0028 | 0.02 | | | |
| L | 0.13 | 0.9 | 2.2 | 0.010 | 0.0010 | 0.03 | 0.0038 | 0.03 | | | |
| M | 0.15 | 1.2 | 4.0 | 0.001 | 0.0019 | 0.03 | 0.0028 | 0.02 | | | |
| O | 0.12 | 0.5 | 2.0 | 0.012 | 0.0030 | 0.03 | 0.0030 | 0.02 | | | |
| P | 0.10 | 1.0 | 2.2 | 0.018 | 9.0020 | 0.03 | 0.0025 | 0.03 | | | |
| Q | 0.10 | 0.1 | 1.7 | 0.008 | 0.0010 | 0.20 | 0.0033 | 0.12 | | 0.31 | 0.30 |
| R | 0.08 | 1.0 | 1.8 | 0.005 | 0.0020 | 0.13 | 0.0030 | 0.10 | | | |
| S | 0.18 | 0.1 | 1.3 | 0.010 | 0.0010 | 0.03 | 0.0032 | 0.04 | | | |
| T | 0.08 | 0.8 | 2.3 | 0.010 | 0.0013 | 0.10 | 0.0030 | 0.12 | | | |

| Steel | Chemical composition (in ras %, balance: Fe and impurities) | | | | | | Ac: (° C.) | Ac: (° C.) |
|---|---|---|---|---|---|---|---|---|
|  | Nb | V | Zr | Mn | W | B | Others | | |
| A | 0.020 | | | | | 0.0010 | | 688 | 924 |
| B | 0.010 | | | | | | | 745 | 913 |
| C | 0.035 | | | 0.13 | | 0.0017 | | 666 | 852 |
| D | | | | 0.10 | | 0.0010 | | 604 | 855 |
| E | 0.010 | | | 0.08 | | | | 658 | 835 |
| F | | 0.10 | | | | | Sn + Tes:0.050 | 708 | 873 |
| G | | | | 0.20 | | 0.0010 | | 589 | 801 |
| H | 0.010 | | | 0.10 | | 0.0009 | Ca + Mg:0.0008 | 682 | 887 |
| I | | | | | | | | 685 | 870 |
| J | | | | | | | | 745 | 869 |
| K | 0.035 | | | 0.11 | | 0.0008 | | 742 | 918 |
| L | | | | | | | Ca:0.0005 | 701 | S69 |
| M | 0.010 | | | | | | | 634 | 935 |
| O | | | | | 0.10 | | | 705 | 853 |
| P | | | 0.10 | | | | Sb:0.020 | 692 | 886 |
| Q | | | | | | | | 724 | 859 |
| R | | | | | | | | 725 | 901 |
| S | | | | | | | Ca + REM:0.0010 | 712 | 817 |
| T | 0.020 | | | | | | REM:0.0010 | 704 | 894 |

TABLE 2

| Hot rolling No. | Steel | Heating temperature (° C.) | F1 entrance side temperature (° C.) | $t_{ini}$ (mm) | $t_{F1}$ (mm) | $t_{F2}$ (mm) | $t_{F3}$ (mm) | FT (° C.) | Total rolling reduction in final three stages (%) | Effective rolling index | Cooling start time (s) | Average cooling rate (° C.) | Coiling temperature (° C.) |
|---|---|---|---|---|---|---|---|---|---|---|---|---|---|
| H-1 | A | 1250 | 910 | 7.5 | 5.1 | 3.8 | 3.0 | 860 | 60 | 1.8 | 1.0 | 40 | 450 |
| H-2 | A | 1250 | 1000 | 3.8 | 2.9 | 2.2 | 1.8 | 950 | 53 | 11.7 | 0.8 | 40 | 550 |
| H-3 | A | 1250 | 980 | 6.2 | 4.6 | 3.6 | 3.0 | 950 | 52 | 15.6 | 0.8 | 40 | 500 |
| H-4 | C | 1250 | 895 | 7.5 | 5.1 | 3.8 | 3.0 | 845 | 60 | 3.1 | 1.0 | 40 | 500 |
| H-5 | C | 1250 | 910 | 15.4 | 8.9 | 5.2 | 3.0 | 860 | 81 | 6.4 | 1.5 | 40 | 550 |
| H-6 | D | 1250 | 910 | 15.4 | 8.9 | 5.2 | 3.0 | 860 | 81 | 2.1 | 15 | 40 | 450 |
| H-7 | E | 1250 | 900 | 5.3 | 5.2 | 3.4 | 3.0 | 830 | 43 | 3.8 | 0.8 | 40 | 500 |
| H-8 | F | 1180 | 910 | 7.5 | 5.1 | 3.8 | 3.0 | 860 | 60 | 8.1 | 1.0 | 40 | 550 |
| H-9 | K | 1250 | 920 | 15.4 | 8.9 | 5.2 | 3.0 | 870 | 81 | 4.7 | 1.5 | 40 | 550 |
| H-10 | D | 1250 | 910 | 7.5 | 5.1 | 3.4 | 3.0 | 860 | 60 | 0.6 | 1.0 | 40 | 580 |
| H-11 | H | 1250 | 1030 | 7.5 | 5.1 | 3.8 | 3.0 | 980 | 60 | 0.8 | 1.0 | 30 | 500 |
| H-12 | J | 1200 | 905 | 15.4 | 8.9 | 5.2 | 3.0 | 855 | 81 | 0.5 | 1.5 | 40 | 500 |
| H-13 | K | 1250 | 870 | 15.4 | 8.9 | 5.2 | 3.0 | 820 | 81 | 1.1 | 1.5 | 15 | 650 |
| H-14 | C | 1250 | 920 | 15.4 | 8.9 | 5.2 | 3.0 | 840 | 81 | 11.3 | 1.5 | 15 | 650 |
| H-15 | L | 1200 | 930 | 7.7 | 5.8 | 4.4 | 3.7 | 880 | 52 | 11.1 | 0.8 | 15 | 650 |
| H-16 | A | 1250 | 950 | 6.2 | 4.6 | 3.6 | 3.0 | 900 | 52 | 1.3 | 0.8 | 40 | 650 |
| H-17 | A | 1250 | 1000 | 6.2 | 4.6 | 3.6 | 3.0 | 950 | 52 | 15.6 | 0.8 | 20 | 650 |
| H-18 | G | 1250 | 910 | 7.5 | 5.1 | 3.8 | 3.0 | 860 | 60 | 8.5 | 1.0 | 15 | 650 |
| H-19 | I | 1200 | 950 | 7.5 | 5.1 | 3.8 | 3.0 | 900 | 60 | 0.2 | 1.0 | 15 | 650 |
| H-20 | B | 1250 | 950 | 5.9 | 4.1 | 3.3 | 2.6 | 900 | 56 | 9.7 | 1.0 | 40 | 550 |
| H-21 | M | 1200 | 980 | 3.8 | 2.9 | 2.2 | 1.8 | 930 | 53 | 3.3 | 0.8 | 20 | 400 |
| H-22 | O | 1280 | 950 | 7.5 | 5.1 | 3.8 | 3.0 | 900 | 60 | 2.9 | 1.0 | 30 | 500 |
| H-23 | P | 1250 | 950 | 3.8 | 2.9 | 2.2 | 1.8 | 900 | 53 | 5.2 | 0.8 | 40 | 550 |
| H-24 | Q | 1280 | 950 | 7.5 | 5.1 | 3.8 | 3.0 | 920 | 60 | 3.9 | 1.0 | 35 | 500 |
| H-25 | R | 1180 | 1000 | 3.8 | 2.9 | 2.2 | 1.8 | 950 | 53 | 2.5 | 0.8 | 60 | 500 |
| H-26 | H | 1180 | 1000 | 3.8 | 2.9 | 2.2 | 1.8 | 950 | 53 | 2.6 | 0.8 | 60 | 500 |
| H-27 | G | 1200 | 850 | 7.5 | 5.1 | 3.8 | 3.0 | 800 | 60 | 1.2 | 1.0 | 40 | 500 |
| H-28 | I | 1200 | 830 | 7.5 | 5.1 | 3.8 | 3.0 | 780 | 60 | 1.6 | 1.0 | 15 | 500 |
| H-29 | J | 1200 | 870 | 15.4 | 8.9 | 5.2 | 3.0 | 820 | 81 | 1.4 | 1.5 | 40 | 500 |
| H-30 | S | 1200 | 870 | 15.4 | 8.9 | 5.2 | 3.0 | 820 | 81 | 1.6 | 1.5 | 60 | 500 |
| H-31 | S | 1200 | 870 | 13.4 | 8.9 | 5.2 | 3.0 | 820 | 81 | 1.6 | 0.1 | 60 | 500 |
| H-32 | S | 1200 | 870 | 15.4 | 8.9 | 5.2 | 3.0 | 820 | 81 | 1.6 | 2.5 | 60 | 500 |
| H-33 | T | 1280 | 920 | 7.5 | 5.1 | 3.8 | 3.0 | 870 | 69 | 1.3 | 1.0 | 60 | 430 |

For each of the resultant hot-rolled sheets, a cross section that was parallel to the rolling direction and the thickness direction was cut, subjected to mirror polish, and then subjected to Nital etching, by which its steel micro-structure was made to appear, and the steel micro-structure was observed under a SEM. Further, from each steel sheet, a specimen that was 25 mm wide (length in the rolling direction) and 25 mm long (length in a direction perpendicular to the rolling direction) and had the same thickness as the steel sheet was cut, a surface of the steel sheet at a ½ depth in its sheet thickness that was parallel to a rolled surface was made to appear by mechanical grinding and chemical polishing, and (200), (110), and (211) inverse pole figures were taken by the X-ray diffraction method. From the resultant inverse pole figures, an orientation distribution function (ODF) was calculated by the spherical harmonics expansion, and the intensity in the {223}<252> orientation was determined based on intensities in [2 2 3](2 −5 2) positioned at (φ1 Φ φ2)=(30°, 43°, 45°) in an Euler space. In measurement/analysis for a BCC structure and at a sheet thickness center, these crystal orientations are equivalent.

Table 3 shows results of the observation, measurement, and analysis.

TABLE 3

| Hot rolling No. | {223}<252> orientation intensity | Micro-structure having maximum area fraction | Balance of micro-structure | Area fracture of balance (%) |
|---|---|---|---|---|
| H-1 | 5.5 | Bainite | Martensite | 12 |
| H-2 | 7.6 | Bainite | Martensite | 20 |
| H-3 | 7.6 | Bainite | Martensite | 17 |
| H-4 | 6.4 | Bainite | Martensite | 14 |
| H-5 | 6.8 | Bainite | Martensite | 11 |
| H-6 | 5.6 | Bainite | — | — |
| H-7 | 6.1 | Bainite | Martensite | 18 |
| H-8 | 6.4 | Bainite | Martensite | 30 |
| H-9 | 5.5 | Bainite | Martensite + retained γ | 25 |
| H-10 | 4.4 | Bainite | — | — |
| H-11 | 4.4 | Bainite | — | — |
| H-12 | 3.5 | Bainite | — | — |
| H-13 | 2.5 | Ferrite | Perlite + 0 | 18 |
| H-14 | 4.1 | Ferrite | Perlite + 0 | 15 |
| H-15 | 3.6 | Ferrite | Perlite | 10 |
| H-16 | 3.2 | Ferrite | Perlite | 12 |
| H-17 | 4.0 | Ferrite | Perlite | 11 |
| H-18 | 3.8 | Ferrite | — | — |
| H-19 | 2.3 | Perlite | — | — |
| H-20 | 3.5 | Ferrite | Bainite | 15 |
| H-21 | 6.4 | Martensite | Bainite + retained γ | 35 |
| H-22 | 6.0 | Bainite | — | — |
| H-23 | 6.5 | Bainite | Martensite | 12 |
| H-24 | 6.0 | Bainite | — | — |
| H-25 | 5.4 | Bainite | — | — |
| H-26 | 5.4 | Bainite | — | — |
| H-27 | 5.4 | Bainite | — | — |
| H-28 | 5.3 | Bainite | Retained γ | 13 |
| H-29 | 5.1 | Bainite | — | — |

TABLE 3-continued

| Hot rolling No. | {223}<252> orientation intensity | Micro-structure having maximum area fraction | Balance of micro-structure | Area fracture of balance (%) |
|---|---|---|---|---|
| H-30 | 5.2 | Bainite | — | — |
| H-31 | 3.6 | Ferrite | Martensite | 32 |
| H-32 | 4.5 | Bainite | Martensite | 10 |
| H-33 | 5.6 | Bainite | Martensite | 8 |

As shown in Table 3, hot rolling numbers H-1 to H-9, H-22 to H-26, H-30, and H-33, which were appropriate in chemical compositions and hot rolling conditions, each show an intensity in the {223}<252> orientation of 5.0 times or more in terms of the random intensity ratio. Hot rolling numbers H-27 to H-29, chemical compositions of which fell out of the regulation but hot rolling conditions were appropriate, each also show an intensity in the {223}<252> orientation of 5.0 times or more in terms of the random intensity ratio.

On the other hand, hot rolling numbers H-10 to H-12, which are under conditions that made the effective rolling index less than 1.2, each show a decreased intensity in the {223}<252> orientation. This is because the recrystallization of austenite in the rolling degraded the texture in a parent phase and impaired the elongation of grains, resulting in a failure to drive variant selection at a time of the γ-α transformation sufficiently and appropriately.

In addition, hot rolling numbers H-13 to H-19, coiling temperatures of which were as high as 650° C. each show a decreased intensity in the {223}<252> orientation. This is because diffusional transformation at a high temperature in the coiling step produces ferrite and/or pearlite, resulting in a failure to drive the variant selection in the transformation appropriately. Of these, hot rolling numbers H-13 and H-19, effective rolling indexes of which were less than 1.2, each show a significantly decreased intensity in the {223}<252> orientation.

In a hot rolling number H-31, which had a cooling start time after the end of the final rolling that was 0.5 s or less, ferrite precipitated at a shear band formed in an austenitic grain, by which ferrite was produced in a large amount, and as a result, its intensity in the {223}<252> orientation was decreased. On the other hand, in a hot rolling number H-32, which had a cooling start time that was more than 2.0 s, although the effective rolling index satisfied its regulation, the recrystallization occurred, and thus its intensity in the {223}<252> orientation was decreased.

Further, in a hot rolling number H-20, in which a steel type B having a low content of Mn was used, its intensity in the {223}<252> orientation was decreased despite its appropriate hot rolling conditions. This is considered to be because a lack of Mn caused production of ferrite through diffusional transformation in the cooling after the rolling, which failed to drive the variant selection in the γ-α transformation appropriately, resulting in a weakened intensity. On the other hand, in a hot rolling number H-21, in which a steel type M having an excessive content of Mn was used, its steel micro-structure mainly contained hard martensite.

Next, pickling was performed on the hot-rolled sheets fabricated in the manner described above to remove scales on their surfaces, and then the cold rolling was performed to produce cold-rolled steel sheets having sheet thicknesses shown in Table 4, and the cold-rolled steel sheets were subjected to heat treatment using a laboratory annealing simulator. Table 4 shows conditions for the cold rolling and the heat treatment. Note that an inside of an annealing furnace is charged with an atmosphere of a wet hydrogen-nitrogen gas having a hydrogen concentration of 10%, and its dew point was set to −40° C. For some examples (test numbers CR-9, CR-12, CR-17, and CR-18), their steel sheets were subjected to the cold rolling after subjected to hot-rolled sheet annealing in which the steel sheets were held in a muffle furnace kept at 600° C. for 1.0 h.

For CR-6 and CR-20, their steel sheets were subjected to the second cooling of the annealing step to a room temperature, and then heated again to 350° C. at 3° C./s and subjected to the overaging treatment for 600 s, and cooled again to the room temperature at 40° C./s. For CR-12, CR-13, CR-27, CR-28, and CR-29, the second cooling was stopped at their respective overaging temperatures shown in Table 4, the overaging treatment was performed at the overaging temperatures for 600 s, and their steel sheets were cooled again to a room temperature at 40° C./s.

TABLE 4

| Test No. | Hot rolling No. | {223}<252> orientation intensity | Hot-rolled sheet annealing | Cold rolling reduction (%) | Sheet thickness (mm) | Heating rate (° C.) | Annealing temperature RHT (° C.) | (RHT-Ac$_2$)/(Ac$_3$-Ac$_1$) |
|---|---|---|---|---|---|---|---|---|
| CR-1 | H-2 | 7.6 | not performed | 52 | 0.9 | 3 | 815 | 0.54 |
| CR-2 | H-2 | 7.6 | not performed | 62 | 0.7 | 3 | 815 | 0.54 |
| CR-3 | H-3 | 7.6 | not performed | 72 | 0.8 | 3 | 815 | 0.54 |
| CR-4 | H-2 | 7.6 | not performed | 52 | 0.9 | 3 | 790 | 0.43 |
| CR-5 | H-2 | 7.6 | not performed | 52 | 0.9 | 3 | 850 | 0.69 |
| CR-6 | H-1 | 5.5 | not performed | 52 | 1.4 | 10 | 850 | 0.69 |
| CR-7 | H-4 | 6.4 | not performed | 50 | 1.5 | 5 | 820 | 0.83 |
| CR-8 | H-6 | 5.6 | not performed | 70 | 0.9 | 10 | 830 | 0.84 |
| CR-9 | H-9 | 5.5 | performed | 50 | 1.5 | 10 | 830 | 0.50 |
| CR-10 | H-22 | 6.0 | not performed | 70 | 0.9 | 5 | 790 | 0.57 |
| CR-11 | H-23 | 6.5 | not performed | 55 | 0.8 | 5 | 800 | 0.56 |
| CR-12 | H-8 | 6.4 | performed | 60 | 1.2 | 5 | 795 | 0.53 |
| CR-13 | H-24 | 6.0 | not performed | 55 | 1.4 | 5 | 810 | 0.64 |
| CR-14 | H-25 | 5.4 | not performed | 55 | 0.8 | 5 | 800 | 0.43 |
| CR-15 | H-26 | 5.4 | not performed | 50 | 0.9 | 10 | 849 | 0.81 |
| CR-16 | H-30 | 5.2 | not performed | 80 | 0.6 | 10 | 780 | 0.73 |
| CR-17 | H-33 | 5.6 | performed | 72 | 0.8 | 10 | 830 | 0.66 |
| CR-18 | H-21 | 6.4 | not performed | 40 | 1.1 | 5 | 760 | 0.42 |
| CR-19 | H-2 | 7.6 | not performed | 52 | 0.9 | 3 | 760 | 0.34 |
| CR-20 | H-2 | 7.6 | not performed | 52 | 0.9 | 3 | 960 | 1.11 |
| CR-21 | H-2 | 7.6 | not performed | 80 | 1.3 | 3 | 800 | 0.47 |

TABLE 4-continued

| Test No. | Hot rolling No. | {223}<252> orientation intensity | Hot-rolled sheet annealing | Cold rolling reduction (%) | Sheet thickness (mm) | Heating rate (° C.) | Annealing temperature RHT (° C.) | (RHT-Ac$_2$)/(Ac$_3$-Ac$_1$) |
|---|---|---|---|---|---|---|---|---|
| CR-22 | H-1 | 5.5 | not performed | 90 | 0.3 | 3 | 800 | 0.47 |
| CR-23 | H-4 | 6.4 | not performed | 50 | 1.5 | 5 | 820 | 0.83 |
| CR-24 | H-16 | 3.2 | not performed | 52 | 1.4 | 15 | 800 | 0.47 |
| CR-25 | H-16 | 3.2 | not performed | 52 | 1.4 | 15 | 850 | 0.69 |
| CR-26 | H-20 | 3.5 | not performed | 50 | 1.3 | 10 | 830 | 0.51 |
| CR-27 | H-12 | 3.5 | not performed | 50 | 1.5 | 10 | 860 | 0.93 |
| CR-28 | H-19 | 2.3 | not performed | 50 | 1.5 | 10 | 850 | 0.89 |
| CR-29 | H-18 | 3.8 | not performed | 50 | 1.5 | 10 | 800 | 1.00 |
| CR-30 | H-27 | 5.4 | not performed | 70 | 0.9 | 30 | 765 | 0.83 |
| CR-31 | H-28 | 5.3 | not performed | 70 | 0.9 | 30 | 780 | 0.51 |
| CR-32 | H-29 | 5.1 | not performed | 70 | 0.9 | 30 | 810 | 0.52 |
| CR-33 | H-4 | 6.4 | not performed | 90 | 0.3 | 3 | 800 | 0.72 |
| CR-34 | H-2 | 7.6 | not performed | 52 | 0.9 | 3 | 850 | 0.69 |
| CR-35 | H-30 | 5.2 | not performed | 52 | 1.4 | 3 | 800 | 0.84 |
| CR-36 | H-2 | 7.6 | not performed | 80 | 0.4 | 3 | 850 | 0.69 |
| CR-37 | H-30 | 5.2 | not performed | 52 | 1.4 | 10 | 800 | 0.84 |
| CR-38 | H-21 | 3.6 | not performed | 60 | 1.2 | 10 | 785 | 0.70 |
| CR-39 | H-32 | 4.5 | not performed | 60 | 1.2 | 10 | 790 | 0.74 |

| Test No. | Annealing time (s) | First cooling rate (° C./s) | First cooling end temperature (° C.) | Second cooling rate (° C./s) | Overaging temperature (° C.) | Kind of steel sheet | |
|---|---|---|---|---|---|---|---|
| CR-1 | 600 | 11 | 785 | 65 | — | CR | Inventive example |
| CR-2 | 600 | 16 | 771 | 50 | — | CR | Inventive example |
| CR-3 | 600 | 21 | 760 | 60 | — | CR | Inventive example |
| CR-4 | 600 | 20 | 730 | 50 | — | CR | Inventive example |
| CR-5 | 600 | 11 | 750 | 82 | — | CR | Inventive example |
| CR-6 | 600 | 23 | 750 | 40 | 350 | CR | Inventive example |
| CR-7 | 600 | 8 | 750 | 40 | — | CR | Inventive example |
| CR-8 | 600 | 15 | 750 | 50 | — | CR | Inventive example |
| CR-9 | 600 | 12 | 790 | 35 | — | CR | Inventive example |
| CR-10 | 800 | 10 | 605 | 40 | — | CR | Inventive example |
| CR-11 | 300 | 25 | 760 | 60 | — | CR | Inventive example |
| CR-12 | 600 | 10 | 749 | 30 | 439 | CR | Inventive example |
| CR-13 | 780 | 10 | 720 | 40 | 350 | CR | Inventive example |
| CR-14 | 300 | 15 | 790 | 60 | — | CR | Inventive example |
| CR-15 | 300 | 10 | 770 | 40 | — | CR | Inventive example |
| CR-16 | 300 | 3 | 605 | 30 | — | CR | Inventive example |
| CR-17 | 600 | 10 | 790 | 60 | — | CR | Inventive example |
| CR-18 | 300 | 10 | 730 | 40 | — | CR | Comparative example |
| CR-19 | 600 | 10 | 750 | 60 | — | CR | Comparative example |
| CR-20 | 600 | 5 | 620 | 30 | 350 | CR | Comparative example |
| CR-21 | 600 | 8 | 770 | 40 | — | CR | Comparative example |
| CR-22 | 600 | 1 | 700 | 50 | — | CR | Comparative example |
| CR-23 | 10 | 90 | — | — | — | CR | Comparative example |
| CR-24 | 600 | 60 | 760 | 40 | — | CR | Comparative example |
| CR-25 | 600 | 15 | 750 | 40 | — | CR | Comparative example |
| CR-26 | 600 | 10 | 750 | 40 | — | CR | Comparative example |
| CR-27 | 300 | 10 | 790 | 80 | 460 | CR | Comparative example |
| CR-28 | 300 | 3 | 800 | 35 | 310 | CR | Comparative example |
| CR-29 | 180 | 11 | 650 | 80 | 350 | CR | Comparative example |
| CR-30 | 300 | 10 | 740 | 50 | — | CR | Comparative example |
| CR-31 | 300 | 15 | 740 | 50 | — | CR | Comparative example |
| CR-32 | 300 | 15 | 780 | 50 | — | CR | Comparative example |
| CR-33 | 600 | 30 | 700 | 70 | — | CR | Comparative example |
| CR-34 | 10 | 28 | 700 | 70 | — | CR | Comparative example |
| CR-35 | 300 | 1 | 600 | 30 | — | CR | Comparative example |
| CR-36 | 600 | 40 | 750 | 40 | — | CR | Comparative example |
| CR-37 | 300 | 30 | 760 | 1 | — | CR | Comparative example |
| CR-38 | 300 | 3 | 650 | 30 | — | CR | Comparative example |
| CR-39 | 300 | 3 | 650 | 30 | — | CR | Comparative example |

CR: Cold-rolled steel sheet

For each of the resultant cold-rolled steel sheets, a cross section that was parallel to the rolling direction and the thickness direction was cut, subjected to mirror polish, and then subjected to Nital etching, by which its steel micro-structure was made to appear, and the steel micro-structure was observed under a SEM at a ½ depth position in its sheet thickness. Further, a cross section of the steel sheet that was parallel to the rolling direction and the sheet thickness direction was similarly cut and subjected to mechanical grinding and electrolytic grinding to have a surface with improved appearance, and a crystal orientation was measured at 1.00 μm intervals in a 500 μm×200 μm region at the ½ depth position in the sheet thickness by the SEM-EBSD method at an observation magnification of 500×. Based on the resultant crystal orientation data, an intensity of γ-fiber was determined from an intensity at a (111) pole on an inverse pole figure in the ND direction by the spherical harmonics expansion with OIM ver.7.3, which is a crystal orientation analysis application from EDAX TEXSEM.

Further, on the same sample, a crystal orientation was measured at 0.05 μm intervals in a 100 μm×200 μm region by the SEM-EBSD method at a magnification of 1500×. Based on the resultant crystal orientation, steel microstructures having crystal orientations that formed angles within 10° from γ-fiber were extracted with OIM ver.7.3, which is a crystal orientation analysis application from EDAX TEXSEM, and KAM values of the steel microstructures were determined.

Further, mechanical properties of the fabricates cold-rolled steel sheets were evaluated by the following method.
<Tensile Test>
Two JIS No. 5 tensile test specimens specified in JIS Z 2241:2011 was taken from each cold-rolled steel sheet in a direction inclined 45° with respect to the rolling direction of the cold-rolled steel sheet, and a tensile strength TS and an elongation after fracture EL (ductility) were measured in conformance with the specification, and an average value of the tensile strength TS and the elongation at break EL was determined.

<Measurement of $r_{45}$ Value>
Two JIS No. 5 tensile test specimens specified in JIS Z 2241:2011 was taken from each cold-rolled steel sheet in a direction inclined 45° with respect to the rolling direction of the cold-rolled steel sheet, and a $r_{45}$ value, which is a plastic strain ratio, was measured in conformance with the specification of JIS Z 2254:2008, and an average value of $r_{45}$ values for the two tensile test specimens was determined. In the present example, a case where the $r_{45}$ value was 1.20 or more was rated as good, and a case where the $r_{45}$ value was 1.30 or more was rated as better.

<Ultimate Deformability>
A tensile fracture surface of each test specimen after the tensile test was photographed in a tensile direction under a SEM, and a two-dimensional projected area of the rupture surface onto a cross section perpendicular to the tensile direction was determined. Then, a natural logarithm of a rate of reduction in area to a cross-sectional area of an original test specimen before the tensile test was determined as an index of the ultimate deformability. In the present example, a case where the value of the index was 0.80 or more was rated as good.

Results of the above are collectively shown in Table 5.

TABLE 5

| Test No. | Ferrite fraction | Microstructure having maximum area fraction | Balance of micro-structure | Average KAM valve (°) | γ-fiber intensity | TS (MPa) | EL (%) | $T_{45}$ value | Ultimate deformability | TS×EL (MPa-%) | |
|---|---|---|---|---|---|---|---|---|---|---|---|
| CR-1 | 66 | Ferrite | Martensite | 1.03 | 5.9 | 947 | 18.2 | 1.48 | 0.97 | 17207 | Inventive example |
| CR-2 | 63 | Ferrite | Martensite | 0.76 | 5.6 | 918 | 18.4 | 1.42 | 1.02 | 16850 | Inventive example |
| CR-3 | 65 | Ferrite | Martensite | 0.60 | 5.4 | 927 | 18.3 | 1.35 | 1.06 | 16978 | Inventive example |
| CR-4 | 67 | Ferrite | Martensite | 1.10 | 5.4 | 840 | 23.6 | 1.32 | 0.88 | 19824 | Inventive example |
| CR-5 | 73 | Ferrite | Martensite | 0.52 | 8.5 | 876 | 21.7 | 1.67 | 1.05 | 18979 | Inventive example |
| CR-6 | 78 | Ferrite | Martensite | 1.74 | 6.1 | 860 | 21.5 | 1.53 | 1.03 | 18490 | Inventive example |
| CR-7 | 65 | Ferrite | Martensite | 0.76 | 4.8 | 980 | 17.4 | 1.31 | 1.02 | 17081 | Inventive example |
| CR-8 | 72 | Ferrite | Bainite + martensite | 0.55 | 5.1 | 796 | 23.4 | 1.35 | 1.06 | 18337 | Inventive example |
| CR-9 | 67 | Ferrite | Martensite + retained γ | 1.00 | 5.1 | 1172 | 14.8 | 1.33 | 0.94 | 17346 | Inventive example |
| CR-10 | 65 | Ferrite | Bainite + martensie | 0.76 | 5.1 | 812 | 22.2 | 1.32 | 1.06 | 18337 | Inventive example |
| CR-11 | 62 | Ferrite | Bainite + martensie + retained γ | 0.95 | 5.9 | 793 | 24.1 | 1.45 | 0.98 | 19072 | Inventive example |
| CR-12 | 73 | Ferrite | Bainite + martensie + retained γ | 0.85 | 4.1 | 1100 | 14.8 | 1.26 | 0.96 | 16812 | Inventive example |
| CR-13 | 71 | Ferrite | Bainite + martensie | 1.10 | 6.7 | 791 | 24.1 | 1.58 | 1.02 | 17674 | Inventive example |
| CR-14 | 62 | Ferrite | Bainite + martensie + retained γ | 0.95 | 4.3 | 790 | 24.1 | 1.29 | 0.93 | 19072 | Inventive example |
| CR-15 | 67 | Ferrite | Bainite | 0.54 | 5.1 | 720 | 23.4 | 1.40 | 1.02 | 16812 | inventive example |
| CR-16 | 63 | Ferrite | Bainite | 0.51 | 5.8 | 1093 | 16.2 | 1.35 | 1.07 | 17674 | Inventive example |
| CR-17 | 62 | Ferrite | Martensite | 0.82 | 6.2 | 918 | 17.5 | 1.46 | 1.02 | 17674 | Inventive example |
| CR-18 | 24 | Martensite | Ferrite + retained γ | 1.90 | 3.5 | 1327 | 4.9 | — | — | 6436 | Comparative example |
| CR-19 | 69 | Ferrite | Martensite | 1.55 | 5.8 | 927 | 20.6 | 1.30 | 0.76 | 19073 | Comparative example |
| CR-20 | 58 | Ferrite | Martensite | 0.60 | 3.2 | 984 | 19.5 | 0.87 | 1.06 | 19188 | Comparative example |
| CR-21 | 67 | Ferrite | Martensite | 1.60 | 4.0 | 975 | 12.7 | 1.10 | 0.77 | 13944 | Comparative example |
| CR-22 | 89 | Ferrite | Perlite + bainite | 0.40 | 3.2 | 564 | 28.9 | 1.00 | 1.12 | 16300 | Comparative example |
| CR-23 | 45 | Martensite | Ferrite | 1.30 | 4.4 | 1130 | 6.7 | — | — | 7873 | Comparative example |
| CR-24 | 65 | Ferrite | Martensite | 0.63 | 3.5 | 940 | 21.1 | 0.79 | 0.86 | 19862 | Comparative example |
| CR-25 | 70 | Ferrite | Martensite | 0.55 | 3.6 | 932 | 22.1 | 0.85 | 0.97 | 20555 | Comparative example |
| CR-26 | 88 | Ferrite | Bainite | 0.54 | 3.8 | 442 | 12.6 | 1.10 | 0.97 | 14409 | Comparative example |
| CR-27 | 7 | Martensite | Ferrite + retained γ | 0.63 | 3.2 | 1200 | 13.7 | 0.85 | 1.00 | 16476 | Comparative example |
| CR-28 | 0 | Martensite | Retained | 1.32 | 3.4 | 1290 | 8.6 | — | — | 11030 | Comparative example |
| CR-29 | 90 | Ferrite | Perlite | 0.56 | 3.5 | 330 | 49.3 | 1.10 | 1.06 | 16253 | Comparative example |
| CR-30 | 99 | Ferrite | Perlite | 0.54 | 3.8 | 328 | 37.3 | 1.10 | 1.06 | 15514 | Comparative example |
| CR-31 | 45 | Ferrite | Ferrite | 0.52 | 1.3 | 827 | 19.2 | 0.82 | 1.17 | 15878 | Comparative example |
| CR-32 | 80 | Ferrite | Martensite | 0.51 | 3.1 | 930 | 21.5 | 0.90 | 1.02 | 19995 | Comparative example |
| CR-33 | 82 | Ferrite | Martensite | 0.62 | 3.3 | 940 | 18.2 | 0.95 | 1.17 | 17308 | Comparative example |
| CR-34 | 85 | Ferrite | Martensite | 1.50 | 5.0 | 950 | 7.1 | — | — | 6217 | Comparative example |
| CR-35 | 90 | Ferrite | Perlite | 0.53 | 4.1 | 406 | 27.8 | 1.30 | 1.07 | 11287 | Comparative example |
| CR-36 | 82 | Ferrite | Martensite | 0.51 | 3.8 | 809 | 25.9 | 0.99 | 1.07 | 20953 | Comparative example |

TABLE 5-continued

| Test No. | Ferrite fraction | Micro-structure having maximum area fraction | Balance of micro-structure | Average KAM valve (°) | γ-fiber intensity | TS (MPa) | EL (%) | T$_{45}$ value | Ultimate deformability | TSxEL (MPa-%) | |
|---|---|---|---|---|---|---|---|---|---|---|---|
| CR-37 | 90 | Ferrite | Perlite | 0.53 | 4.1 | 422 | 27.8 | 1.30 | 1.07 | 11731 | Comparative example |
| CR-38 | 62 | Ferrite | Bainite | 0.63 | 3.5 | 788 | 18.0 | 0.88 | 1.10 | 14184 | Comparative example |
| CR-39 | 6 | Ferrite | Bainite | 0.85 | 3.8 | 795 | 18.1 | 0.92 | 0.98 | 14390 | Comparative example |

As shown in Table 5, in test numbers CR-1 to CR-17, which satisfied the specifications according to the present invention, each exerted an excellent r$_{45}$ value and excellent ultimate deformability while exerting a tensile strength as high as 700 MPa or more. In contrast, in a test number CR-18, its content of Mn was excessive, and thus a transformation point was low, and in addition, a steel microstructure mainly containing martensite was formed because ferrite transformation was insufficient in the cooling, which disturbed the strength-ductility balance (TS×EL), making it difficult to measure the r$_{45}$ value and the ultimate deformability.

In a test number CR-19, its annealing temperature was excessively low, and thus a cold-rolling strain remained in its steel micro-structure, resulting in decrease in the ultimate deformability. Further, in a test number CR-20, its annealing temperature was excessively high, and thus the intensity of γ-fiber was decreased, resulting in decrease in the r$_{45}$ value.

In a test number CR-21, its cold rolling reduction was excessively low, which makes the intensity of γ-fiber insufficient, and a cold-rolling strain remained in its steel microstructure, resulting in decrease in the ductility and the r$_{45}$ value. On the other hand, in a test number CR-22, its cold rolling reduction was excessively high, and its first cooling rate was low, and thus pearlite precipitated in the cooling, resulting in decrease in the strength. Further, the discontinuous recrystallization was promoted, which made its texture random, and the intensity of γ-fiber was decreased, resulting in decrease in the r$_{45}$ value.

In a test number CR-23, its annealing duration was short, and in addition, rapid cooling was performed without the two-stage cooling, which failed to provide ferrite sufficiently, and in addition, a cold rolling strain remained in the ferrite, disturbing the strength-ductility balance. Note that it was difficult to measure the r$_{45}$ value and the ultimate deformability from this specimen.

In test numbers CR-24, CR-25, CR-38, and CR-39, intensities in the {223}<252> orientation in their hot-rolled sheets used were low, which thus failed to increase the intensity of γ-fiber despite appropriate production conditions for the subsequent steps were appropriate, resulting in decrease in the r$_{45}$ value.

In test numbers CR-26 to CR-29, chemical compositions of their hot-rolled sheets used did not satisfy the specifications according to the present invention, and intensities in the {223}<252> orientation in their hot-rolled sheets used were low, which thus failed to increase the intensity of γ-fiber, resulting in decrease in the r$_{45}$ value.

In a test number CR-30, its strength was low because a content of C in its hot-rolled sheet used was low, and after the annealing, its texture was made to be random due to a shear band in the cold rolling because Ti was not contained, resulting in decrease in the r$_{45}$ value. In a test number CR-31, its fraction of ferrite in its hot-rolled sheet used was low after the annealing because a content of C in its hot-rolled sheet used was excessively high, and its texture was made to be random due to a shear band in the cold rolling because Ti was not contained, resulting in decrease in the r$_{45}$ value. In a test number CR-32, its texture was made to be random due to a shear band in the cold rolling because Ti was not contained in the hot-rolled sheet used, resulting in decrease in the r$_{45}$ value.

Test numbers CR-33 to CR-37 were comparative examples, in which their chemical compositions satisfied the specifications according to the present invention, whereas their production conditions fell out of suitable conditions. Specifically, in a test number CR-33, its cold rolling reduction was high, and thus its texture was made to be random due to a shear band in the cold rolling, resulting in decrease in the r$_{45}$ value.

In a test number CR-34, its annealing duration was short, and a strain remained in its steel micro-structure, degrading the strength-ductility balance. In a test number CR-35, its first cooling rate was excessively low, which caused pearlite to precipitate in its steel micro-structure, and hard phases were not formed, resulting in decrease in the strength. Further, in a test number CR-36, its first cooling rate was excessively high, which inhibited strengthening of γ-fiber by grain growth, resulting in decrease in the r$_{45}$ value. In a test number CR-37, its second cooling rate was excessively low, which caused pearlite to precipitate in its steel micro-structure, and hard phases were not formed, resulting in decrease in the strength.

EXAMPLE 2

Pickling was performed on some of the hot-rolled sheets fabricated in EXAMPLE 1 to remove scales on their surfaces, and then the cold rolling was performed to produce cold-rolled steel sheets having sheet thicknesses shown in Table 6. Subsequently, the cold-rolled steel sheets were subjected to heat treatment that simulated annealing in an atmosphere of a wet hydrogen-nitrogen gas having a hydrogen concentration of 20% with a dew point of −40° C., using a laboratory plating simulator. For some examples (test numbers G-3 and G-5), their steel sheets were subjected to the cold rolling after subjected to hot-rolled sheet annealing in which the steel sheets were held in a muffle furnace kept at 600° C. for 1.0 h.

After subjected to the annealing and the first cooling, the cold-rolled steel sheets were subjected to the second cooling that was performed to 470° C. being a galvanizing bath temperature and then stopped, and the cold-rolled steel sheets were immersed for 3 s, drawn up, and subjected to the gas wiping to adjust an adhesion amount to 50 g/m$^2$ per side, by which hot-dip galvanized steel sheets were fabricated. Subsequent to the hot-dip galvanizing treatment, some of the steel sheets were subjected to alloying treatment in which heating was performed using an infrared heating furnace at various temperatures for 30 s, and then cooled to a room temperature at 3° C./s, by which hot-dip galvannealed steel sheets were fabricated. Table 6 shows conditions for the cold rolling, the heat treatment, and the alloying treatment.

cold-rolled steel sheets having sheet thicknesses shown in Table 8, which were subjected to heat treatment that simulated annealing using a laboratory plating simulator. In the

TABLE 6

| Test No. | Hot rolling No. | {223}<252> orientation intensity | Hot-rolled sheet annealing | Cold rolling reduction (%) | Sheet thickness (mm) | Heating rate (° C./s) | Annealing temperature RHT (° C.) | (RHT-$Ac_2$)/ ($Ac_3$-$Ac_1$) |
|---|---|---|---|---|---|---|---|---|
| G-1 | H-2 | 7.6 | not performed | 72 | 0.5 | 10 | 820 | 0.56 |
| G-2 | H-2 | 7.6 | not performed | 72 | 0.5 | 10 | 839 | 0.64 |
| G-3 | H-2 | 7.6 | performed | 52 | 0.9 | 10 | 850 | 0.69 |
| G-4 | H-7 | 6.1 | not performed | 72 | 0.8 | 10 | 805 | 0.83 |
| G-5 | H-25 | 5.4 | performed | 55 | 0.8 | 10 | 800 | 0.43 |
| G-6 | H-17 | 4.0 | not performed | 70 | 0.9 | 5 | 800 | 0.47 |

| Test No. | Annealing time (s) | First cooling rate (° C./s) | First cooling end temperature (° C.) | Second cooling rate (° C.) | Alloying treatment temperature (° C.) | Kind of steel sheet | |
|---|---|---|---|---|---|---|---|
| G-1 | 300 | 5 | 760 | 50 | — | GI | Inventive example |
| G-2 | 120 | 5 | 670 | 30 | 570 | GA | Inventive example |
| G-3 | 300 | 5 | 790 | 65 | 530 | GA | Inventive example |
| G-4 | 400 | 20 | 730 | 60 | 550 | GA | Inventive example |
| G-5 | 300 | 1 | — | 1 | 550 | GA | Comparative example |
| G-6 | 300 | 20 | 700 | 3 | 650 | GA | Comparative example |

GI: Galvanized steel sheet,
GA: Galvannaled steel sheet

For the resultant hot-dip galvanized steel sheets and hot-dip galvannealed steel sheets, measurement of their steel micro-structures and evaluation of their mechanical properties were conducted by same method as in EXAMPLE 1. Results of the above are collectively shown in Table 7.

heat treatment, atmospheres corresponding to a heating zone and a holding zone for the annealing were separately controlled. Specifically, for the atmosphere corresponding to the heating zone, dew points and hydrogen densities shown in Table 8 were set. Thereafter, gas replacement was performed

TABLE 7

| Test No. | Ferrite fraction | Micro-structure having maximum area fraction. | Balance of micro-structure | Average KAM value (°) | γ-fiber intensity | TS (MPa) | EL (%) | $T_{45}$ value | Ultimate deformability | TS×EL (MPa·%) | |
|---|---|---|---|---|---|---|---|---|---|---|---|
| G-1 | 71 | Ferrite | Martensite | 0.68 | 5.6 | 784 | 21.5 | 1.35 | 1.07 | 16856 | Inventive example |
| G-2 | 67 | Ferrite | Bainite + martensite | 0.66 | 6.1 | 807 | 20.8 | 1.40 | 1.06 | 16753 | Inventive example |
| G-3 | 74 | Ferrite | Martensite | 0.80 | 8.2 | 783 | 20.8 | 1.60 | 1.02 | 16255 | Inventive example |
| G-4 | 67 | Ferrite | Bainite + martensite | 0.60 | 5.1 | 901 | 17.8 | 1.33 | 1.06 | 16038 | Inventive example |
| G-5 | 86 | Ferrite | Perlite + bainite | 1.10 | 6.0 | 569 | 25.2 | 1.35 | 0.98 | 14339 | Comparative example |
| G-6 | 83 | Ferrite | Perlite + bainite | 0.70 | 3.8 | 625 | 25.2 | 1.02 | 1.03 | 13750 | Comparative example |

As shown in Table 7, in test numbers G-1 to G-4, which satisfied the specifications according to the present invention, each exerted an excellent $r_{45}$ value and excellent ultimate deformability while exerting a tensile strength as high as 700 MPa or more. In contrast, in a test number G-5, its cooling rate after the annealing was low, and the two-stage cooling was not performed, which produced an excess of ferrite and caused precipitation of pearlite, decreasing the tensile strength, and degrading the strength-ductility balance. Further, in a test number G-6, an intensity in the {223}<252> orientation in its hot-rolled sheet used was low, which thus failed to increase the intensity of γ-fiber, resulting in decrease in the $r_{45}$ value. In addition, its alloying heat treatment temperature was excessively high, resulting in decrease in the strength.

EXAMPLE 3

Pickling was performed on some of the hot-rolled sheets fabricated in EXAMPLE 1 to remove scales on their surfaces, and then the cold rolling was performed to produce immediately, the atmosphere was adjusted to be an atmosphere having a hydrogen concentration of 20% and a dew point of −40° C. as the atmosphere corresponding to the holding zone, and cooling was performed in the atmosphere as it is.

In test numbers DC-6 to DC-8, after subjected to the annealing and the first cooling, their cold-rolled steel sheets were subjected to the second cooling that was performed to 470° C. being a galvanizing bath temperature and then stopped, and the cold-rolled steel sheets were immersed for 3 s, drawn up, and subjected to the gas wiping to adjust an adhesion amount to 50 g/m² per side, by which hot-dip galvanized steel sheets were fabricated. Subsequent to the hot-dip galvanizing treatment, steel sheets of DC-7 and DC-8 were subjected to alloying treatment in which heating was performed using an infrared heating furnace at 550° C. for 30 s, and then cooled to a room temperature at 3° C./s, by which hot-dip galvannealed steel sheets were fabricated. Table 8 shows conditions for the cold rolling, the heat treatment, and the alloying treatment.

TABLE 8

| Test No. | Hot rolling No. | {223}<252> orienation. intensity | Hot-rolled sheet annealing | Cold rolling reduction (%) | Sheet thickness (mm) | Heating rate (° C./s) | Annealing temperature RHT (° C.) | (RHT-Ac$_2$)/(Ac$_3$-Ac$_1$) | Annealing time (s) |
|---|---|---|---|---|---|---|---|---|---|
| DC-1 | H-1 | 5.5 | not performed | 52 | 1.4 | 30 | 850 | 0.69 | 600 |
| DC-2 | H-2 | 7.6 | not performed | 52 | 0.9 | 3 | 815 | 0.54 | 400 |
| DC-3 | H-2 | 7.6 | not performed | 70 | 0.5 | 3 | 830 | 0.60 | 300 |
| DC-4 | H-2 | 7.6 | not performed | 52 | 0.9 | 3 | 760 | 0.31 | 700 |
| DC-5 | H-25 | 5.4 | hotpertored | 55 | 0.8 | 5 | 800 | 0.43 | 200 |
| DC-6 | H-7 | 6.1 | not performed | 80 | 0.6 | 5 | 805 | 0.83 | 60 |
| DC-7 | H-7 | 6.1 | not performed | 80 | 0.6 | 5 | 760 | 0.58 | 30 |
| DC-8 | H-7 | 6.1 | not performed | 80 | 0.6 | 5 | 805 | 0.83 | 400 |

| Test No. | Dew point (° C.) | Hydrogen concentration (%) | First cooling rate (° C./s) | First cooling end temperature (° C.) | Second cooling rare (° C.) | Allying treatment temperstre (° C.) | Kid of steel sheet | |
|---|---|---|---|---|---|---|---|---|
| DC-1 | −7 | 0 | 23 | 750 | 40 | — | CR | Inventive example |
| DC-2 | −10 | 0 | 11 | 785 | 65 | — | CR | Inventive example |
| DC-3 | −40 | 6 | 29 | 760 | 65 | — | CR | Inventive example |
| DC-4 | −40 | 0 | 50 | 750 | 60 | — | CR | Comparative example |
| DC-5 | −18 | 0 | 10 | 780 | 50 | — | CR | Inventive example |
| DC-6 | −2 | 3 | 20 | 730 | 60 | — | GI | Inventive example |
| DC-7 | −35 | 3 | 3 | 720 | 40 | 550 | GA | Inventive example |
| DC-8 | −2 | 0 | 10 | 730 | 50 | 550 | GA | Inventive example |

CR: Cold-rolled steel sheet,
GI: Galvanized steel sheet,
GA: Galvannealed steel sheet For the resultant cold-rolled steel sheets, hot-dip galvanized steel sheets, and hot-dip galvannealed steel sheets, measurement of their steel micro-structures and evaluation of their mechanical properties were conducted by same method as in EXAMPLE 1.

In addition, a cross section of each steel sheet that is parallel to the rolling direction and the thickness direction of the steel sheet is cut, subjected to mirror polish, and then subjected to Nital etching, by which its steel micro-structure is made to appear, and structure observation was performed under a SEM, which gave a SEM image of the steel micro-structure on the cross section in a vicinity of an outer layer photographed at a magnification of 1000×. Then, on the resultant SEM image, five lines extending in the thickness direction are drawn at 20 μm intervals in the rolling direction, on each line, the shortest distance from the surface of the steel sheet to a hard phase is measured, and an average value of the shortest distances was taken as a thickness of a decarburized layer. Note that decarburized layers were formed on outer layers of a steel sheet on both sides, and the thickness of the decarburized layer means the thickness per side.

Further, flexural properties of the resultant steel sheets were evaluated by the following bend test.

<Bend Test>

From the steel sheets, strip shaped specimens were cut and subjected to the bend test after burrs were removed carefully. The specimens were cut such that the specimens each had a length of 20 mm in a direction along a bending ridge and a length of 45 mm in a direction perpendicular to the bending ridge, and angles formed by the bending ridge with the rolling direction were 0°, 45°, and 90°.

Next, V-shaped punches having a tip angle of 90° were prepared such that a ratio (Rp/t) between sheet thicknesses (t) of the specimens and a tip radius of the punch (Rp) was 1.0 or 0.5, and a V bend test with a bending angle 90° was conducted in such a manner that a longitudinal center portion of each specimen was pushed, with a force of 40 kN, against a dice that was placed on an Instron universal testing machine and had a V-shaped groove with a groove angle of 90°. After the V bend test, the bending ridge was subjected to SEM observation at a magnification of 40×, by which presence/absence of cracking in a vicinity of a longitudinal center portion of the bending ridge was checked. Then, a case where no cracking occurred on bending ridges of specimens cut in all of the angles was rated as ○, and a case where cracking occurred on a bending ridge of a specimen cut in any one of the angles was rated as ×.

Results of the above are collectively shown in Table 9.

TABLE 9

| Test No. | Ferrite fraction | Micro-structure having maximum area fraction | Balance of micro-structure | thickness of decarburized layer (μm) | Average KAM value (°) | γ-fiber intensity | TS (MP) (%) | EL (%) |
|---|---|---|---|---|---|---|---|---|
| DC-1 | 78 | Ferrite | Martensite | 8.1 | 0.74 | 6.1 | 876 | 21.5 |
| DC-2 | 68 | Ferrite | Martensite | 6.4 | 1.03 | 5.9 | 938 | 18.3 |
| DC-3 | 62 | Ferrite | Martensite | — | 1.00 | 5.9 | 940 | 17.2 |
| DC-4 | 69 | Ferrite | Martensite | — | 1.55 | 5.2 | 927 | 20.6 |
| DC-5 | 66 | Ferrite | Bainite + martensite + retained γ | 4.2 | 1.00 | 4.4 | 788 | 24.6 |
| DC-6 | 67 | Ferrite | Bainite + martensite | 5.6 | 0.82 | 5.1 | 940 | 18.0 |
| DC-7 | 75 | Ferrite | Bainite + martensite | 2.2 | 1.20 | 5.5 | 880 | 19.0 |
| DC-8 | 70 | Ferrite | Bainite + martensite | 6.5 | 0.60 | 5.1 | 890 | 17.2 |

TABLE 9-continued

| Test No. | $T_{45}$ value | Ulimate deformability | TSxEL (MPa-%) | Bend test Rp/t:1.0 | Rp/t:0.5 | |
|---|---|---|---|---|---|---|
| DC-1 | 1.51 | 1.03 | 18834 | ○ | ○ | Inventive example |
| DC-2 | 1.40 | 0.95 | 17165 | ○ | ○ | Inventive example |
| DC-3 | 1.42 | 1.00 | 16168 | ○ | X | Inventive example |
| DC-4 | 1.30 | 0.76 | 19073 | ○ | X | Comparative example |
| DC-5 | 1.27 | 0.95 | 19385 | ○ | ○ | inventive example |
| DC-6 | 1.33 | 0.95 | 16920 | ○ | ○ | Inventive example |
| DC-7 | 1.35 | 0.90 | 16720 | ○ | X | Inventiv e example |
| DC-8 | 1.35 | 1.10 | 15308 | ○ | ○ | Inventive exampie |

As shown in Table 9, in test numbers DC-1 to DC-3 and DC-5 to DC-8, which satisfied the specifications according to the present invention, each exerted an excellent $r_{45}$ value and excellent ultimate deformability while exerting a tensile strength as high as 700 MPa or more. In contrast, in a test number DC-4, its annealing temperature was excessively low, and thus a cold-rolling strain remained in its steel micro-structure, resulting in decrease in the ultimate deformability.

Further, of the inventive examples of the present invention, in test numbers DC-1, DC-2, DC-5, DC-6, and DC-8, in each of which a decarburized layer having a thickness of 4.0 μm or more was formed, cracking did not occur on their bending ridges even under a stringent formation condition that (Rp/t) was 0.5, resulting in excellent flexural properties exerted.

INDUSTRIAL APPLICABILITY

According to the present invention, it is possible to provide a steel sheet that has a tensile strength of 700 MPa or more and has an excellent formability including a $r_{45}$ value of 1.20 or more and an ultimate deformability of 0.80 or more. Therefore, the steel sheet according to the present invention is suitably applicable to a starting material for a covering member such as a door and a hood.

The invention claimed is:
1. A steel sheet having
a chemical composition consisting of, in mass %:
C: 0.03 to 0.25%,
Si: 0.1 to 2.0%,
Mn: 1.0 to 3.0%,
P: 0.200% or less,
S: 0.0500% or less,
Al: 0.01 to 1.00%,
N: 0.0100% or less,
Ti: 0.01 to 0.25%,
Cr: 0 to 0.50%,
Ni: 0 to 0.50%,
Cu: 0 to 0.50%,
Nb: 0 to 0.050%,
V: 0 to 0.15%,
Zr: 0 to 0.15%,
Mo: 0 to 0.15%,
W: 0 to 0.15%,
one or more elements selected from Sn, Sb, and Te: 0 to 0.100% in total,
one or more elements selected from Ca, Mg, and REM: 0 to 0.0050% in total,
B: 0 to 0.0050%,
with the balance: Fe and impurities, and
a steel micro-structure containing, in area %:
ferrite: 50 to 85%,
with the balance being one or more selected from martensite, bainite, and retained austenite, wherein
an intensity of γ-fiber is more than 4.0 times in terms of random intensity ratio, and an average KAM value of grains having crystal orientations that form angles within 10° from γ-fiber is 1.30° or less.

2. The steel sheet according to claim 1, comprising a decarburized layer having a thickness of 4.0 μm or more from a surface of the steel sheet in a depth direction.

3. A steel sheet comprising a chemical composition comprising, in mass %:
C: 0.03 to 0.25%,
Si: 0.1 to 2.0%,
Mn: 1.0 to 3.0%,
P: 0.200% or less,
S: 0.0500% or less,
Al: 0.01 to 1.00%,
N: 0.0100% or less,
Ti: 0.01 to 0.25%,
Cr: 0 to 0.50%,
Ni: 0 to 0.50%,
Cu: 0 to 0.50%,
Nb: 0 to 0.050%,
V: 0 to 0.15%,
Zr: 0 to 0.15%,
Mo: 0 to 0.15%,
W: 0 to 0.15%,
one or more elements selected from Sn, Sb, and Te: 0 to 0.100% in total,
one or more elements selected from Ca, Mg, and REM: 0 to 0.0050% in total,
B: 0 to 0.0050%,
with the balance: Fe and impurities, and
a steel micro-structure containing, in area %:
ferrite: 50 to 85%,
with the balance being one or more selected from martensite, bainite, and retained austenite, wherein
an intensity of γ-fiber is more than 4.0 times in terms of random intensity ratio, and an average KAM value of grains having crystal orientations that form angles within 10° from γ-fiber is 1.30° or less.

* * * * *